United States Patent
Tandy et al.

(10) Patent No.: US 12,254,491 B2
(45) Date of Patent: Mar. 18, 2025

(54) DATA COMMUNICATION USING MILLIMETER WAVE TECHNOLOGY AND STORAGE THEREOF

(71) Applicant: PayPal, Inc., San Jose, CA (US)

(72) Inventors: Clare Patrice Tandy, Portola Valley, CA (US); Maria Mileder, Swords (IE); Raquel Buckley, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 476 days.

(21) Appl. No.: 17/589,292

(22) Filed: Jan. 31, 2022

(65) Prior Publication Data

US 2023/0246828 A1     Aug. 3, 2023

(51) Int. Cl.
*G06Q 30/0251*     (2023.01)
*G06Q 30/0207*     (2023.01)
*H04W 4/02*     (2018.01)

(52) U.S. Cl.
CPC ..... *G06Q 30/0259* (2013.01); *G06Q 30/0224* (2013.01); *G06Q 30/0261* (2013.01); *G06Q 30/0267* (2013.01); *H04W 4/025* (2013.01); *G06Q 2220/00* (2013.01)

(58) Field of Classification Search
CPC ........... G06Q 30/0224; G06Q 30/0259; G06Q 30/0261; G06Q 30/0267; G06Q 2220/00; H04W 4/025
USPC .......................................................... 705/64
See application file for complete search history.

(56) References Cited

U.S. PATENT DOCUMENTS

| 10,461,421 | B1 | 10/2019 | Tran et al. |
| 11,189,368 | B2 | 11/2021 | Heath |
| 11,734,677 | B1* | 8/2023 | Kang .................. G06Q 20/367 705/65 |
| 2019/0373472 | A1 | 12/2019 | Smith et al. |
| 2021/0150578 | A1* | 5/2021 | Cheng ............... G06Q 30/0267 |
| 2021/0256582 | A1* | 8/2021 | Jaramillo .............. G06Q 30/02 |
| 2021/0279762 | A1* | 9/2021 | Eklund ............. G06Q 30/0226 |
| 2023/0027380 | A1* | 1/2023 | Sutton-Shearer ..... H04L 9/3213 |
| 2023/0060306 | A1* | 3/2023 | Eivy .................... G06Q 20/367 |

* cited by examiner

*Primary Examiner* — Courtney P Jones
(74) *Attorney, Agent, or Firm* — HAYNES AND BOONE, LLP

(57) ABSTRACT

A user device of a user is detected to be within a first predefined range of a first wireless apparatus. The first wireless apparatus may be a wireless device operating in a frequency spectrum in a gigahertz range and/or based on a millimeter wave technology. One or more electronic messages are received from at least the first wireless apparatus or a second wireless apparatus that is located outside of the first predefined range of the first wireless apparatus. The second wireless apparatus is communicatively coupled to the first wireless apparatus. The second wireless apparatus may be another wireless device operating in the frequency spectrum in the gigahertz range and/or based on the millimeter wave technology. At least a subset of the one or more electronic messages is presented to the user via the user device. A user interaction is determined with the presented one or more electronic messages.

20 Claims, 13 Drawing Sheets

---

800

- Detect that a user device of a user is within a first predefined range of a first wireless apparatus — 810
- Receive one or more electronic messages from at least the first wireless apparatus or a second wireless apparatus that is located outside of the first predefined range of the first wireless apparatus, the second wireless apparatus being communicatively coupled to the first wireless apparatus — 820
- Present at least a subset of the one or more electronic messages to the user via the user device — 830
- Determine a user interaction with the presented at least the subset of the one or more electronic messages — 840

DATA COMMUNICATION USING MILLIMETER WAVE TECHNOLOGY AND STORAGE THEREOF

BACKGROUND

Field of the Invention

The present disclosure generally relates to wireless communications and blockchain technology. More specifically, the present disclosure relates to conducting communications between wireless devices (e.g., 5G devices based on millimeter wave technology) deployed at different locations and mobile devices of users, recording communication data to a blockchain, and generating non-fungible tokens (NFTs) via the blockchain.

Related Art

Rapid advances have been made in the past several decades in the fields of computer technology and telecommunications. For example, the deployment of wireless networks (e.g., 5G cellular networks) allows users to conduct wireless communications via their mobile devices, such as cellular phones, tablet computers, or wearable devices at higher speeds and with greater throughput. The wireless communications allow the users to engage in electronic activities such as browsing the web, make wireless telephone calls, send/receive emails or electronic text messages, download/stream media content (e.g., movies, music, videos, etc.), purchase goods, etc. As another example, blockchain technology has been introduced to improve the security of electronic transactions. A blockchain system may comprise a growing list of records (also called blocks) that are linked together using cryptography. Compared to conventional systems, blockchain systems are more resistant to the modification of the data stored in the blocks and therefore offers protection against hacking. However, the capabilities of wireless networks and blockchains have not been sufficiently utilized to improve a user experience. Therefore, what is needed is a system and method to leverage the capabilities of wireless networks and blockchains to improve the user experience.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

Figure 1:
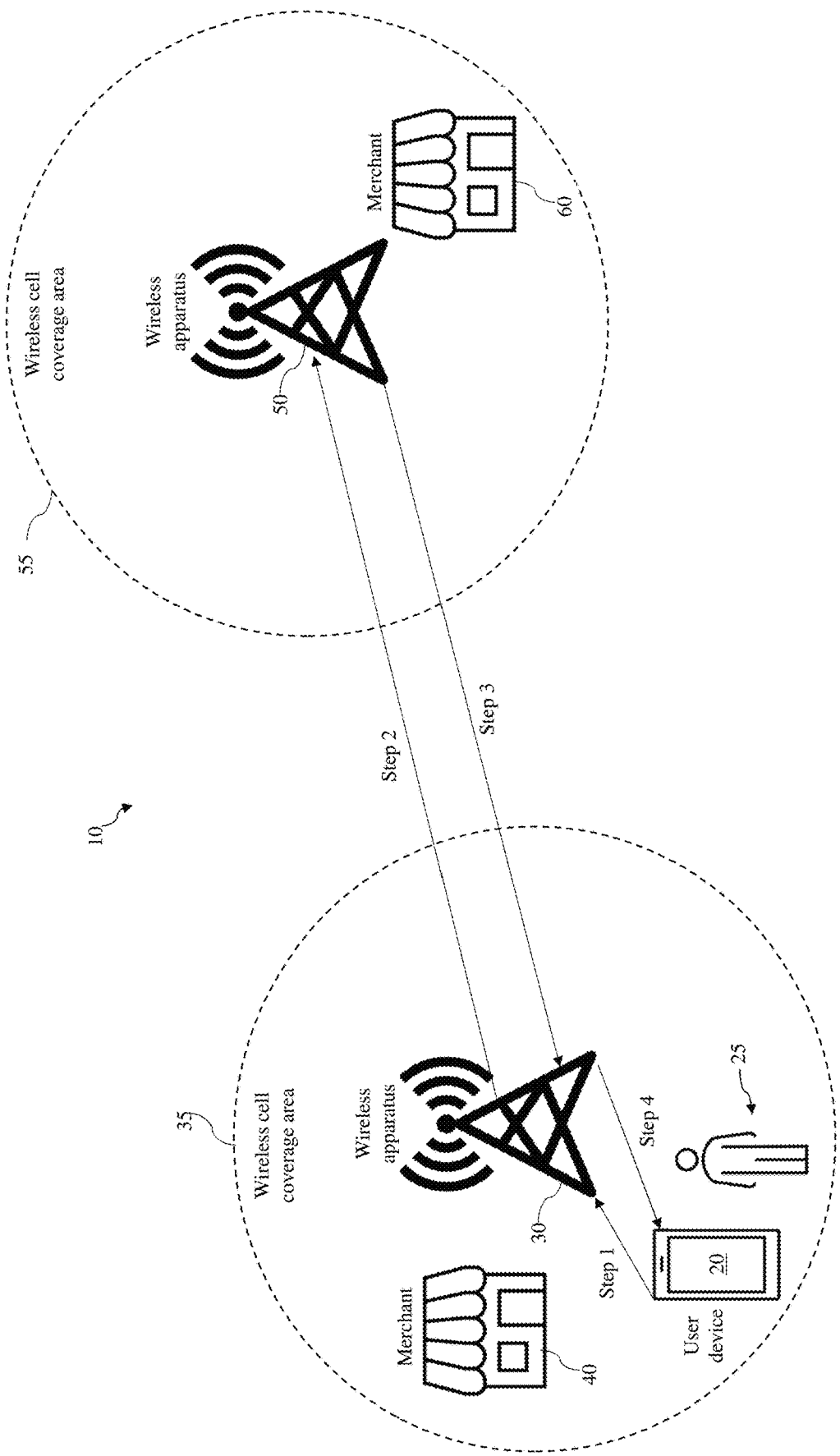
FIGS. 1-4 are simplified block diagrams that illustrate interactions between various entities according to various aspects of the present disclosure.

In the following description of the various embodiments, reference is made to the accompanying drawings identified above and which form a part hereof, and in which is shown by way of illustration various embodiments in which aspects described herein may be practiced. It is to be understood that other embodiments may be utilized, and structural and functional modifications may be made without departing from the scope described herein. Various aspects are capable of other embodiments and of being practiced or being carried out in various different ways.

Offer Generation Scheme

Rewards programs are useful tools for merchants to incentivize return customers and to attract new customers. Merchants may offer a discount on an item or even a free item for customers who have met certain requirements. However, existing rewards programs have many shortcomings. For example, it may be complex to support these rewards programs at scale, and it may also be difficult to align them with specific marketing plans and make them worth the time and investment into the systems, particularly for small merchants. Furthermore, many merchants rely on analog processes (e.g., customer receives a stamp on a physical card for every sandwich purchased and then gets the $10^{th}$ sandwich for free), which are limited to specific purchases and are inflexible. In addition, existing rewards programs may also be limited to the stock and/or inventory of the underlying product. Moreover, existing rewards programs often lack personalized offerings based on customer profiles, let alone personalized offerings based on the real-time behavior of the customer.

The present disclosure addresses the issues discussed above by leveraging the capabilities of modern day wireless networks and blockchain technology, such that a $3^{rd}$ party coordinator or the merchants themselves may offer behavior-based cross-business incentives to customers. For example, upon a customer's arrival at a location of a first merchant where a wireless apparatus (e.g., a relaying 5G base station or another millimeter wave technology device operating in a gigahertz spectrum) is deployed, a list of offers may be wirelessly relayed by the wireless apparatus to the customer's 5G-enabled mobile device. In some embodiments, at least some of the offers may contain a cross-business incentive. For example, in order to redeem such an offer, the customer needs to purchase goods, products, or services from both the first merchant and a second merchant at a different location. If the customer opts-in to view the offers via the mobile device, then private processing would occur on the device locally, which would select a subset of the offers customized to the customer's habits and current location. The customer may view the presented offers and accept or decline them individually. The acceptance status of the offers may be relayed to the wireless apparatus (e.g., other 5G base stations or other millimeter wave technology devices operating in a gigahertz spectrum) associated with the various merchants. The customer may finally redeem any given offer while visiting a location of the merchant associated with the offer, for example via wireless communications conducted between the customer's mobile device and the wireless apparatus at that merchant's location.

The offer acceptance and/or the offer completion status of a customer may also be built into a profile of the customer, along with more detailed habits, which could help train a machine-learning model to predict the customer's behavior better and to further customize results. In some embodiments, the offer acceptance and/or the offer completion status of a customer may also be written into a blockchain system to facilitate the accurate tracking of the customer's profile and habits. Through the above process, merchants (particularly small merchants) may have flexibility in the incentives they offer without manually processing or targeting the incentives. In addition, these incentives are based on real-time data pertaining to the customers, which allow the offers to be more accurately tailored to the customers. Furthermore, the cross-business incentives may uplift geographically-proximate businesses.

Implementations of the present disclosure will now be described in detail with reference to the accompanying Figures. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

FIGS. 1-4 are block diagrams that illustrates different portions of a process flow 10 according to embodiments of the present disclosure. For example, FIG. 1 generally illustrates an initial offer creation portion of the process flow 10, FIGS. 2-3 generally illustrates an offer processing and redemption encoding portion of the process flow 10, and FIG. 4 generally illustrates a post-redemption processing portion of the process flow 10.

Referring now to FIG. 1, the process flow 10 begins as a user device 20 of a user 25 establishes a wireless communication session with a wireless apparatus 30. In some embodiments, the user device 20 may be a smartphone (e.g., APPLE™ IPHONE™), a tablet computer (e.g., APPLE™ IPAD™), or a wearable device (e.g., APPLE™ WATCH™). The user device 20 may be equipped with a wireless transceiver capable of conducting cellular network communications. The wireless transceiver may include a transceiver capable of conducting millimeter wave wireless network communications. As a non-limiting example, the millimeter wave wireless network communications may include 5G ($5^{th}$ generation) cellular network communications, which may be conducted under the 5G NR (New Radio) standard. Some 5G networks have a first frequency range that is greater than 1 gigahertz (GHz) but less than 6 GHz, where the maximum channel bandwidth is 100 megahertz (MHz). Some other 5G networks have a second frequency range that is between 24 GHz and 54 GHz, where the minimum channel bandwidth is 50 MHz, and the maximum channel bandwidth is 400 MHz. Regardless of the specific implementation of the 5G network, 5G networks have faster speed, lower latency, greater bandwidth, and smaller cell sizes compared to older cellular communication technologies such as 4G (e.g., Long Term Evolution or LTE) or 3G (WCDMA or CDMA-2000).

Due at least in part to the small cell sizes of 5G networks, a greater number of 5G devices (e.g., base stations, power stations, nodes, subnetworks, or user devices) may be deployed per unit area compared to 4G or 3G networks. For example, using a shopping mall as a non-limiting example, one or two 4G base stations (e.g., 4G cell towers) may be sufficient to cover the entire shopping mall, and users within the shopping mall may use their respective mobile devices to communicate with that one or two 4G base stations to get 4G network coverage. However, tens or hundreds of 5G stations may be deployed throughout the shopping mall to ensure that users have sufficient 5G network coverage as they roam around the shopping mall. While it may be somewhat expensive for a 5G network operator (e.g., VERIZON™ or AT&T™) to deploy the greater number of 5G base stations, such an implementation may offer certain benefits. For example, the greater number of 5G base stations (and their corresponding small cell sizes) allows more granularity in geographical coverage, so that each 5G base station may be associated with a specific merchant and/or with a specific geographical location in the shopping mall.

In the embodiment of FIG. 1, the wireless apparatus 30 may be implemented as a wireless device based on millimeter wave technology and operating in a gigahertz frequency spectrum (e.g., between 1 GHz and 6 GHz, or between 24 GHz and 54 GHz). In a non-limiting example, the wireless apparatus 30 may be a 5G base station (or a 5G small cell) that is capable of wirelessly communicating with the user device 20 under a given 5G cellular networking protocol. In other embodiments, the wireless apparatus 30 may be implemented as a power station, a node, a subnetwork, or even another user device, that is also based on the millimeter wave technology and operating in the gigahertz frequency spectrum. In yet other embodiments, the wireless apparatus 30 may be implemented via a 4G cellular network device, a 3G cellular network device, a Wi-Fi$^t$-enabled device, or a Bluetooth™-enabled device.

As shown in FIG. 1, the wireless apparatus 30 may have a wireless cell coverage area 35, which may have a theoretical maximum radius of about 500 meters without obstructions in some embodiments. In a real world context, the radius of the wireless cell coverage area 35 may be substantially smaller than the maximum radius of about 500 meters. For example, the radius of the wireless cell coverage area 35 may have a range between about 10 meters and about 100 meters in a setting with numerous obstructions (e.g., in a shopping mall context). In contrast, the radius of a 4G wireless cell may have a range on the order of several kilometers. Due to the smaller wireless coverage area, the wireless apparatus 30 may be uniquely associated with one or more entities that are nearby.

For example, in the embodiment of FIG. 1, a merchant 40 is located in the wireless cell coverage area 35. As such, the wireless apparatus 30 may be uniquely associated with the merchant 40, or vice versa. In some embodiments, the wireless apparatus 30 may be at least partially owned or operated by the merchant 40. In other embodiments, the wireless apparatus 30 may be owned or operated by a different entity (e.g., a wireless network operator) than the merchant 40, but a predefined relationship between that entity and the merchant 40 allows the entity and the merchant 40 to communicate or collaborate with each other. In yet other embodiments, a third party operator (e.g., PAYPAL™) may have collaborated with both the merchant 40 and the entity that owns/operates the wireless apparatus 30 to establish the association between the merchant 40 and the wireless apparatus 30. In that case, the third party operator may associate each of a plurality of merchants with their own wireless apparatus that is located near them. It is understood that in embodiments where multiple merchants (or other types of entities) reside within the wireless cell coverage area 35, the wireless apparatus 30 may be associated with the multiple merchants as well.

Similarly, other wireless apparatuses may have their own wireless coverage areas and their associated entities that also reside within the wireless coverage areas. As a non-limiting example, a wireless apparatus 50, which is located remotely from the wireless apparatus 30, has a wireless cell coverage area 55. A merchant 60 may reside within the wireless cell coverage area 55 and may be associated with the wireless apparatus 50. The wireless apparatus 30 may be capable of conducting wireless communications with the wireless apparatus 50.

As discussed above, although 5G base stations (or other millimeter wave technology based devices) may be used as example implementations of the wireless apparatuses herein, this is not intended to be limiting unless otherwise claimed. In other embodiments, the wireless apparatuses herein may be implemented using 4G or 3G base stations, Wi-Fi™ routers, or Bluetooth™-enabled wireless beacons as well. Furthermore, the determination of the user device 20 coming into the wireless cell coverage area 35 may also be made at least in part based on the satellite positioning of the user device 20. For example, the user device 20 may be equipped with Global Positioning System (GPS) sensors, which may monitor and report the GPS location coordinates of the user device 20. The GPS location coordinates may then be reported to one or more entities, such as mobile applications running on the user device 20 or the wireless apparatus 30. A map database such as GOOGLE MAPS™ may then be accessed by these entities to determine whether the user device 20 is within a predefined distance from merchant 40, based on a comparison of the GPS location coordinates of the user device 20 and the GPS location coordinates of the merchant 40 obtained from the map database. In some embodiments, a combination of the direct wireless communication between the user device 20 and the wireless apparatus 30 and the GPS coordinates of the user device 20 may be used collectively to make the determination that the user has arrived at (or is sufficiently close to) the merchant 40.

In any case, the establishment of the wireless communication session between the user device 20 and the wireless apparatus 30 indicates that the user 25 is nearby the wireless apparatus 30 and therefore is close to the merchant 40 as well. As a part of such a wireless communication session, the wireless apparatus 30 may receive or otherwise obtain, from the user device 20, data pertaining to the user 25. In some embodiments, this data may include the shopping history and/or offer redemption history of the user 25, which may be in the form of a Non-Fungible Token (NFT), as will be discussed below in more detail. This personalized user data may help entities such as the merchants 40 and/or 60 to generate better customized offers for the user 25. In other embodiments, in order to protect the user 25's privacy and avoid sending the user's personal data outside of the user device 20, the wireless apparatus 30 merely obtains a user ID from the user device 20 but not the shopping history and/or offer redemption history of the user 25. In that case, the customization of the offers for the user 25 will occur locally on the user device 20 in a later process discussed below.

In a step 2 of the process flow 10, after the wireless apparatus 30 establishes the wireless communication (e.g., under the 5G protocol in this example) with the user device 20 and/or receives the personalized user data from the user device 20, the wireless apparatus 30 may wirelessly contact nearby wireless apparatuses located within a predefined range (e.g., all the wireless apparatuses located within 1 kilometer) to alert them of the user 25's presence and to solicit offers or other incentives for the user 25. The wireless apparatus 30 may include the personalized data (e.g., the user 25's shopping history or offer redemption history) as a part of the message to be broadcast to other wireless apparatuses.

In some embodiments, the communication of the personalized data of the user 25 is done in an anonymized fashion, for example, without using the user 25's real name, phone number, email, or other types of identifying information. In this manner, the user's privacy is protected while the wireless apparatuses receive the user's personalized but anonymous data. In some embodiments, the wireless apparatus 30 may use a unique user identification (ID) to uniquely identify the user 25 to the other wireless apparatuses. For example, the user 25 may be asked to complete an initial registration process at some point (either before the process flow 10 takes place, or during), in which he/she provides the unique user ID (e.g., user123, or some other suitable alphanumeric string) to allow himself/herself to be subsequently identified by other entities. The user ID does not reveal the true identity (e.g., real name, address, phone number, etc.) of the user 25, and therefore its usage herein helps to protect the anonymity of the user 25 throughout the various steps of the process flow 10. In other embodiments, the wireless apparatus 30 includes the user ID as a part of its broadcast message, but does not include any of the user 25's personalized shopping data, so as to further protect the user 25's private data.

In the embodiment shown in FIG. 1, the wireless apparatus 30 contacts the wireless apparatus 50 to solicit offers on behalf of the user 25 of the user device 20. In this transmission, the wireless apparatus 30 includes the user ID of the user 25, along with personalized shopping data of the user, without revealing the true and private identity of the user to the wireless apparatus 50, since the true and private identity of the user is not known by the wireless apparatus 30. In other embodiments, the wireless apparatus 30 transmits the user ID of the user 25, but not the personalized shopping data of the user 25, to the wireless apparatus 50.

It is understood that the wireless apparatus 30 may contact a plurality of other nearby wireless apparatuses in addition to the wireless apparatus 50, but these additional contacts are not illustrated herein for reasons of simplicity. In an alternative embodiment, an establishment such as a shopping mall may have a central wireless apparatus that is capable of communicating with all of the other wireless apparatuses, and these wireless apparatuses may or may not directly communicate with each other. In that case, the wireless apparatus 30 may contact the central wireless apparatus to alert the central wireless apparatus of the user 25's arrival and that the user 25 is ready to receive offers and/or incentives. The central wireless apparatus may then relay the message to one or more other wireless apparatuses, such as the wireless apparatus 50.

In a step 3 of the process flow 10, the wireless apparatus 50 obtains one or more offers or incentives for the user 25 from the merchant 60 and sends these offers or incentives to the wireless apparatus 30. In some embodiments, the wireless apparatus 50 obtains the offers or incentives from the merchant 60 in real time. In other words, the wireless apparatus 50 may inform (through a suitable wireless communication channel) a machine of the merchant 60 that the user 25 is now within the wireless cell coverage area 35 and is ready to receive offers or incentives from nearby merchants. The machine of the merchant 60—which may be a desktop computer, a laptop computer, a tablet computer, or a cellular phone—may receive the message from the wireless apparatus 50 in the form of a text alert, an email, or an in-app message that arrives within a mobile application or a desktop/laptop application.

In embodiments where the message includes the user 25's personalized shopping history or offer redemption history, the merchant 60 may be able to generate a more customized offer or incentive for the user 25. In other embodiments where the message merely includes the unique user ID of the user 25 but no personalized user data, the merchants may generate generic offers that are available to not just the user 25, but also to a plurality of other users (and possibly for all users participating in the scheme of the present disclosure). In other words, the offers may be generated in a user-agnostic manner. In these embodiments, the user device 20 may perform on-device processing to filter through these offers and determine which offers to actually present to the user 25, based on the user 25's shopping history and/or offer acceptance or redemption history.

It is also understood that the offers or incentives generated by the merchant 60 need not be in real time. For example, a database (not illustrated herein for the sake of simplicity) may store a list of offers or incentives that the merchant 60 is willing to offer to prospective users. The list of offers or incentives may also be broken down to different tiers, where a first subset of offers or incentives may be presented to a tier-1 user (e.g., a user having a credit score above 700, or a user who has shopped at the merchant previously), a second subset of offers or incentives may be presented to a tier-2 user (e.g., a user having a credit score between 600 and 700, or a user who has never shopped at the merchant previously), so on and so forth.

In some embodiments, the offer generation may utilize federated machine learning, which is a machine learning technique that trains a machine learning algorithm across multiple decentralized edge devices or servers holding local data samples, without exchanging them. In other words, federated machine learning allows a plurality of entities to build a common and robust machine learning model without sharing data that may be sensitive to the users. As a non-limiting example, the federated machine learning algorithms may be implemented on the wireless apparatuses 30 and/or 50 (or in a central wireless apparatus that controls all the local wireless apparatuses, if a central wireless apparatus is implemented), which allows them to generate more customized offers for the users based on which offers are accepted, declined, or redeemed by the user, while still maintaining the user 25's anonymity and privacy as much as possible.

Regardless of how the offers or incentives are generated, the wireless apparatus 50 obtains them and transmits them back to the wireless apparatus 30 via the suitable wireless link therebetween (e.g., a 5G or another millimeter wave technology wireless communication link) as a part of the step 3 of the process flow 10. In addition, the step 3 may also involve the wireless apparatus 30 obtaining offers and/or incentives from its associated merchant 40. In other words, the wireless apparatus 30 may alert the merchant 40 of the user 25's arrival within the wireless cell coverage area 35 and sends the user 25's personalized data (or just the unique user ID) to the merchant 40. The merchant 40 may generate the offers and/or incentives for the user in a similar manner as the merchant 60.

In some embodiments, the offers and/or incentives generated by either the merchant 40 or the merchant 60 (or both) may be cross-business in nature. In that regard, a cross-business offer or incentive may encompass user participations at multiple merchants or businesses. For example, a cross-business offer involving the merchant 40 and the merchant 60 may ask a user to purchase a product at the merchant 40 in order to get a discount for a product at the merchant 60, or vice versa. As a non-limiting example, the merchant 40 may be a clothing apparel store, and the merchant 60 may be a coffee shop. The merchants 40 and 60 may give the user a cross-business offer in which the user may get a 25% discount on coffee or pastries bought at merchant 60, if the user has bought $50 worth of clothing at the merchant 40. Of course, the cross-business offer may also be reversed in that the user may get a 10% discount on the clothing bought at merchant 40, if the user agrees to order ahead $30 worth of coffee or pastries at the merchant 60.

Regardless of what types of offers are generated for the user, the wireless apparatus 30 wirelessly transmits the offers to the user 25 via the user device 20 via a step 4 of the process flow 10. In some embodiments, such a wireless transmission may be done via a 5G communication session (or a communication session based on another suitable millimeter wave technology) between the wireless apparatus 30 and the user device 20. In some embodiments, all of the available offers generated for the user 25 are transmitted to the user device 20. In other embodiments, only a subset of the available offers are transmitted to the user device 20. For example, the wireless apparatus 30 may include a software analytics module that is configured to analyze the offers received in view of the personalized data extracted from the user 25 in step 1. Based on such an analysis, the software analytics module will select and present the offers that fit one or more predefined criteria. In some embodiments, an upper limit is placed on the number of offers to be presented to the user, so as to not overwhelm the user 25 with too many offers. The offers presented to the user 25 are offers that are determined to be most likely accepted by the user 25.

As a simple non-limiting example, the shopping or offer redemption history data for the user 25 may reveal that the user 25 has received a particular offer from a particular merchant a number of times before (e.g., an offer to buy movie tickets at 10% discount from a movie theatre), and yet the user 25 has never accepted or redeemed such an offer. This indicates that the user 25 is not interested in such an offer and is unlikely to accept it even if it is presented to the user. In fact, the user 25 may become annoyed if such an offer is presented to the user 25 repeatedly. As such, the software analytics module may remove such an offer from the list of offers to be presented to the user 25. As another simple non-limiting example, the shopping or offer redemption history data for the user 25 may reveal that the user 25 does not normally accept any offers from a given merchant A, but the user 25 often accepts offers from the merchant A if it is presented with a cross-business incentive with another merchant B. In that case, the software analytics module may prevent merchant A's standalone offers from being presented to the user 25, but it may present cross-business offers involving merchant A and merchant B to the user 25. In any case, the user 25 may receive the presented offers via email, electronic text, or an in-app notification.

Figure 2:
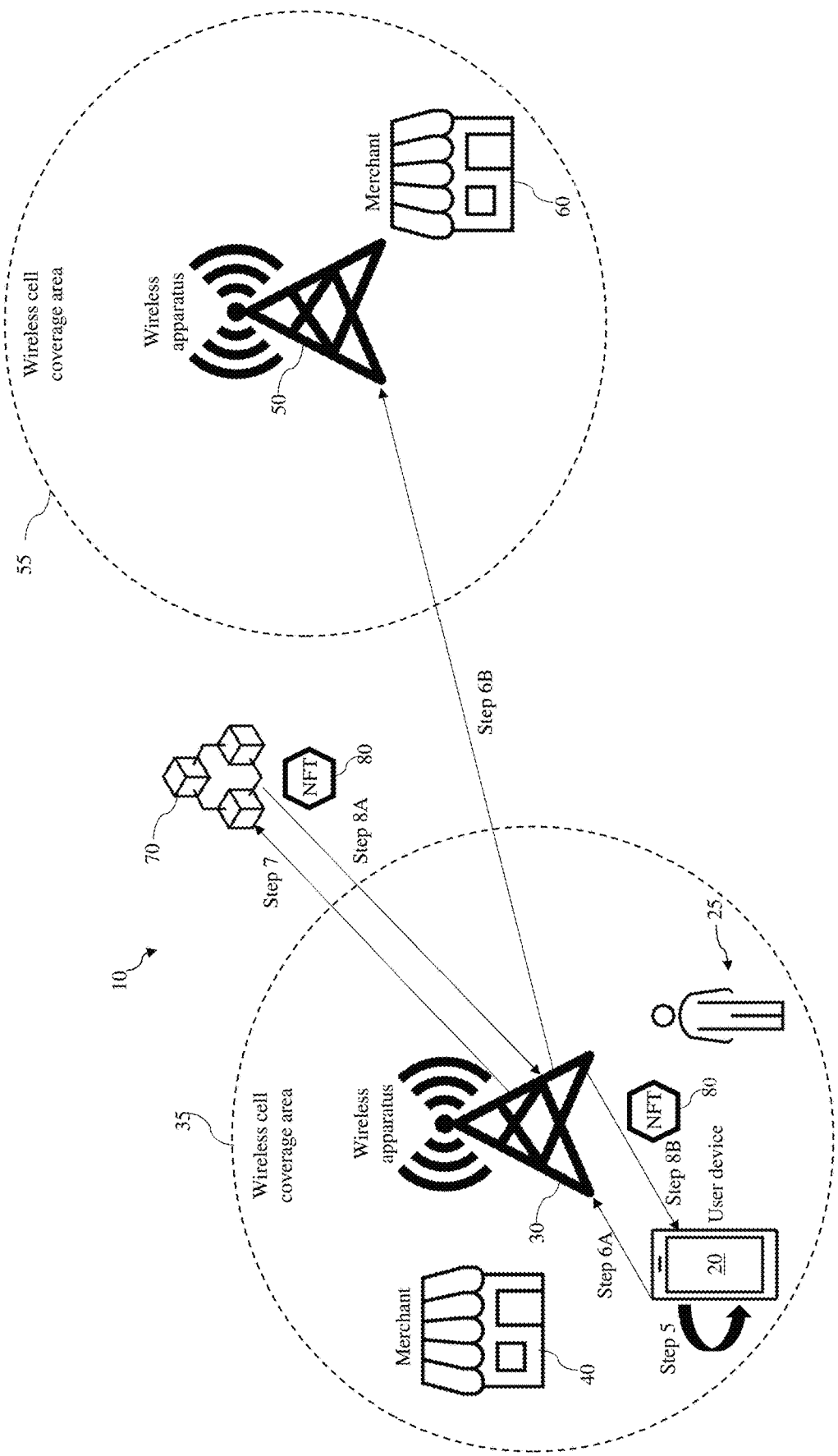

In other embodiments, the offer selection and presentation process may take place locally on the user device 20, rather than on the wireless apparatus 30. This is illustrated in FIG. 2 in a step 5 of the process flow 10. For example, the software analytics module discussed above may be installed on the user device 20 locally, and the software analytics module may access the user 25's shopping history or offer redemption history, which may be stored locally on the user device 20 or on a remote electronic database. In this embodiment, the user device 20 receives a generic (e.g., not customized to the user 25) list of offers from the wireless apparatus 30, and the software analytics module executing on the user device 20 may filter through this generic list of offers and determine which offers to actually present to the user 25.

Regardless of how the offers are filtered and presented to the user 25, once they are presented, and the user 25 selects which offers to accept and/or redeem, the user acceptance status or redemption status of the offers may be transmitted back to the wireless apparatus 30 in a step 6A of the process flow 10, and such statuses may be relayed by the wireless apparatus 30 to other wireless apparatuses (e.g., the wireless apparatus 50) in a step 6B of the process flow 10, via 5G or other millimeter wave based wireless communications.

As discussed above, one of the features of millimeter wave technology networks is the low latency and faster speed, both of which help improve the user experience in the context of the present disclosure. For example, from the user 25's perspective, as soon as he/she walks by or into the merchant 40 (e.g., by coming within the wireless cell coverage area 35), he/she may see a message (either a text message, an email, or an in-app notification through a mobile application) informing him/her that a list of offers involving the merchant 40 and/or other remotely-located merchants (e.g., the merchant 60) is available. The user 25 may then view the details of the list of offers and decide which ones to accept, decline, or put on hold. The user 25 need not be aware of the background processes (e.g., processes associated with steps 1-5 discussed above) that took place before the offers are presented via the user device 20. In fact, since millimeter wave technology networks (e.g., 5G) have much lower latency and faster speed than 4G or older generation wireless networks, the offer generation and/or presentation may feel almost instantaneous from the user 25's perspective, which may improve user satisfaction.

Another benefit is that the scheme herein does not require the user to specifically log into a network (since the user device 20 connects to the wireless apparatus 30 automatically as the user 25 roams about) or manually check-in at each merchant every time the user 25 wishes to receive offers. At most, the user 25 may have to consent to receiving offers at some point in time, for example, during an initial user registration via a mobile application installed on the user device 20, where the offers may be presented through a user interface of the mobile application.

Still referring to FIG. 2, according to step 7 of the process flow 10, the user 25's offer acceptance or redemption statuses may be recorded in a blockchain 70, additional details of which will be discussed below with reference to FIGS. 5-9. For example, suppose the following list of offers are presented to the user 25:

- offer A that pertains to a membership reward associated with the merchant 40 (e.g., every $10^{th}$ purchase of a product is free);
- offer B that pertains to a discount of a product of the merchant 40;
- offer C that pertains to a discount of a product of the merchant 40 if the user 25 also buys a product of the merchant 60 (e.g., as a form of a cross-business incentive);
- offer D that pertains to a membership reward associated with the merchant 60;
- offer E that pertains to a discount of a product of the merchant 60;
- offer F that pertains to a discount of a product of the merchant 60 if the user 25 also buys a product of the merchant 40;

Suppose that the user 25 has declined offer A, accepted and redeemed offers B and D, did not respond to the offer C (e.g., neither accepted nor declined the offer), and accepted but has not redeemed offers E and F. Each of these statuses (or at least a subset thereof) may then be sent by the wireless apparatus 30 to the blockchain 70 for recordation.

In some embodiments, the blockchain 70 may generate one or more non-fungible tokens (NFTs) 80 in a step 8A of the process flow 10 to reflect the acceptance and redemption of the offers B and D. In that regard, an NFT may refer to a unique digital representation of an item on a blockchain, and it may be used as proof of ownership of that digital item. For example, a digital picture may be stored on the blockchain, and the ownership of that digital picture may be created in the form of an NFT via the blockchain. Just as a name on a deed to a house proves the ownership of that house (which is a unique piece of real estate), or a signed statement of authenticity from an artist or an expert on the artist proves the ownership of a painting (which is a unique item), an NFT may serve as digital proof of ownership for a digital item on the blockchain. The digital item may be a digital video, a digital song, a digital picture, a digital record, or in this case, an acceptance status or redemption status of an offer. Each NFT is unique and is associated with a specific unit of data stored on the blockchain, and it cannot be reproduced and is thus non-fungible. Due to these features, NFTs are well-suited for tracking the shopping history or behavioral patterns of users individually.

Note that while different NFTs may be generated for the offers B and D (e.g., a first NFT for the offer B and a second NFT for the offer D), they are collectively illustrated as the NFTs 80 for the sake of simplicity. In other words, the NFTs 80 shown in FIG. 2 may represent not just one, but multiple NFTs. In some embodiments, each NFT is stored in a different block of the blockchain 70. Regardless of how the NFTs 80 are stored, it/they may be associated with a user profile of the user 25.

Still referring to FIG. 2, a record of the NFTs 80, or a link to the NFTs 80, is sent by the blockchain 70 to the wireless apparatus 30 as a part of the step 8A. The record or link to the NFTs 80 may then be forwarded to the user device 20 in a step 8B of the process flow 10. Such a record or link to the NFTs 80 is then accessible on the user device 20 to allow the user to view the NFTs 80 stored on the blockchain 70. For example, the user may view the NFTs 80 via a mobile application (e.g., a mobile application by PAYPAL™) running on the user device 20.

In some embodiments, the record or link of the NFTs 80 may also be obtained by other wireless apparatuses as a part of the personalized user data when the user device 20 establishes wireless communication sessions with the other wireless apparatuses, so that offer-generation entities (e.g., nearby merchants) may be able to better analyze the user profile to determine which customized offers to generate for the user 25. For example, the NFTs 80 may indicate how many times a discounted product (e.g., reduced price for a coffee) of a particular merchant has been accepted and/or redeemed by the user 25. That merchant may then determine that no more discounts should be offered to the user for that product for a predefined period of time (e.g., for the rest of the calendar year). As another example, the NFTs 80 may indicate that the user 25 is very likely to purchase a product offered by the merchant 40 only if a cross-business incentive with a product offered by the merchant 60 is also available, or vice versa, but that the user 25 is unlikely to purchase products from either merchant 40 or merchant 60 without a cross-business incentive. In that case, the merchants 40 and 60 may collaborate together and generate and present to the user 25 offers that are cross-business in nature. As discussed above, the user 25's true identity (e.g., name or phone number) is not revealed to the merchants in an effort to protect the privacy of the user 25, but the NFTs 80 are still able to provide the merchants a glimpse of the unique habits and behavioral patterns of the user 25.

Figure 3:
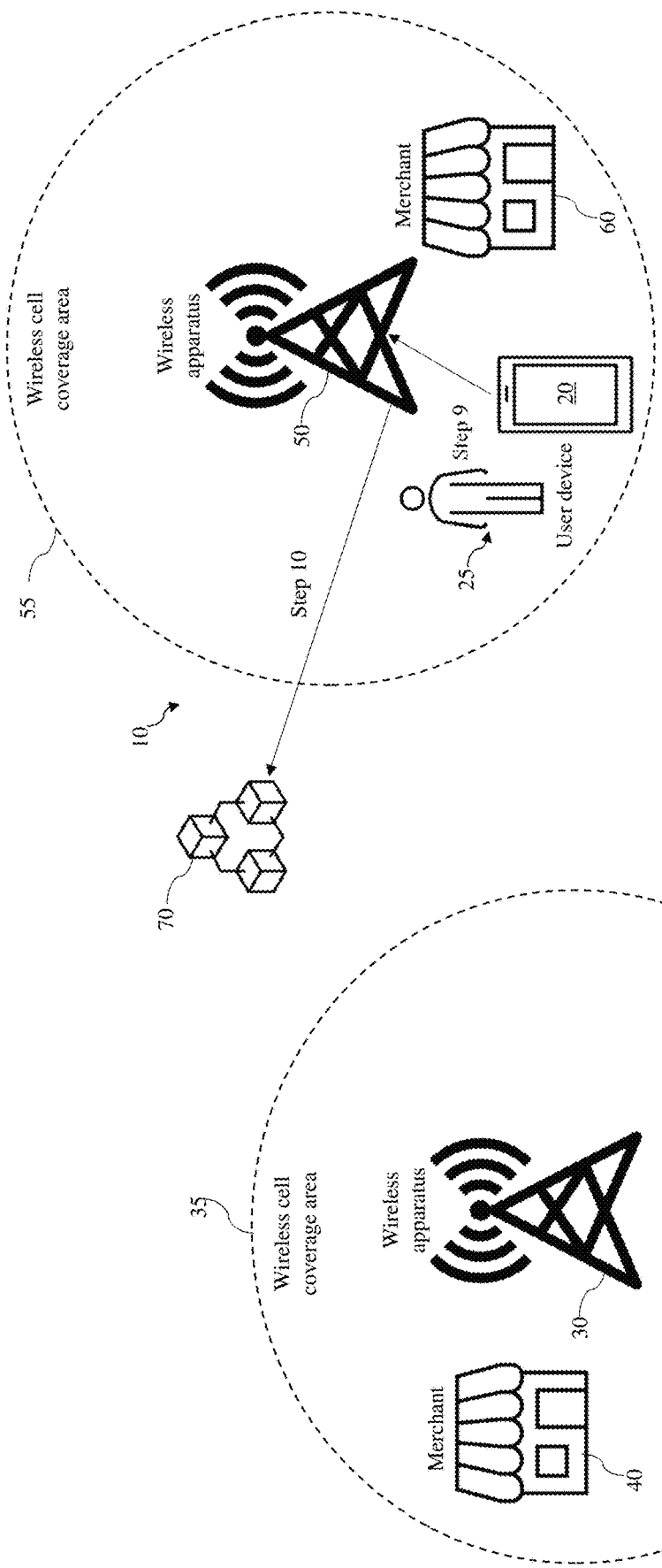

Referring now to FIG. 3, in a step 9 of the process flow 10, the user 25 (along with the user device 20) has left the wireless cell coverage area 35 and has now moved into the wireless cell coverage area 55 of the wireless apparatus 50. In other words, the user device 20 has now established a millimeter wave technology wireless communication session with the wireless apparatus 50 according to step 9. Since the user 25 is now located near the merchant 60, he/she may redeem the offers E and/or F discussed above involving the merchant 60. In a step 10 of the process flow 10, the redemption statuses of the offers E and/or F may then be communicated by the wireless apparatus 50 to the blockchain 70 and then recorded in one or more blocks of the blockchain 70. Note that the blocks in which the redemption statuses of the offers E and/or F are recorded may be different than the blocks in which the other offer acceptance and/or redemption statuses of the user 25 are recorded. As discussed above, the redemption statuses of the offers E and/or F may also be associated with the user profile of the user 25.

It is understood that in some embodiments, the wireless apparatus 50 may also obtain the personalized user data from the user device 20—which may include the NFTs 80 generated previously—and broadcast the arrival of the user device 20 to other wireless apparatuses, similar to how the wireless apparatus 30 broadcasted the arrival of the user device 20 to the wireless apparatus 50 in step 2 of the process flow 10. The other wireless apparatuses may then generate and send offers to the user device 20 via the wireless apparatus 50 in a similar manner. For reasons of simplicity, these additional processes (similar to the steps 2-8) are not discussed again herein.

Figure 4:
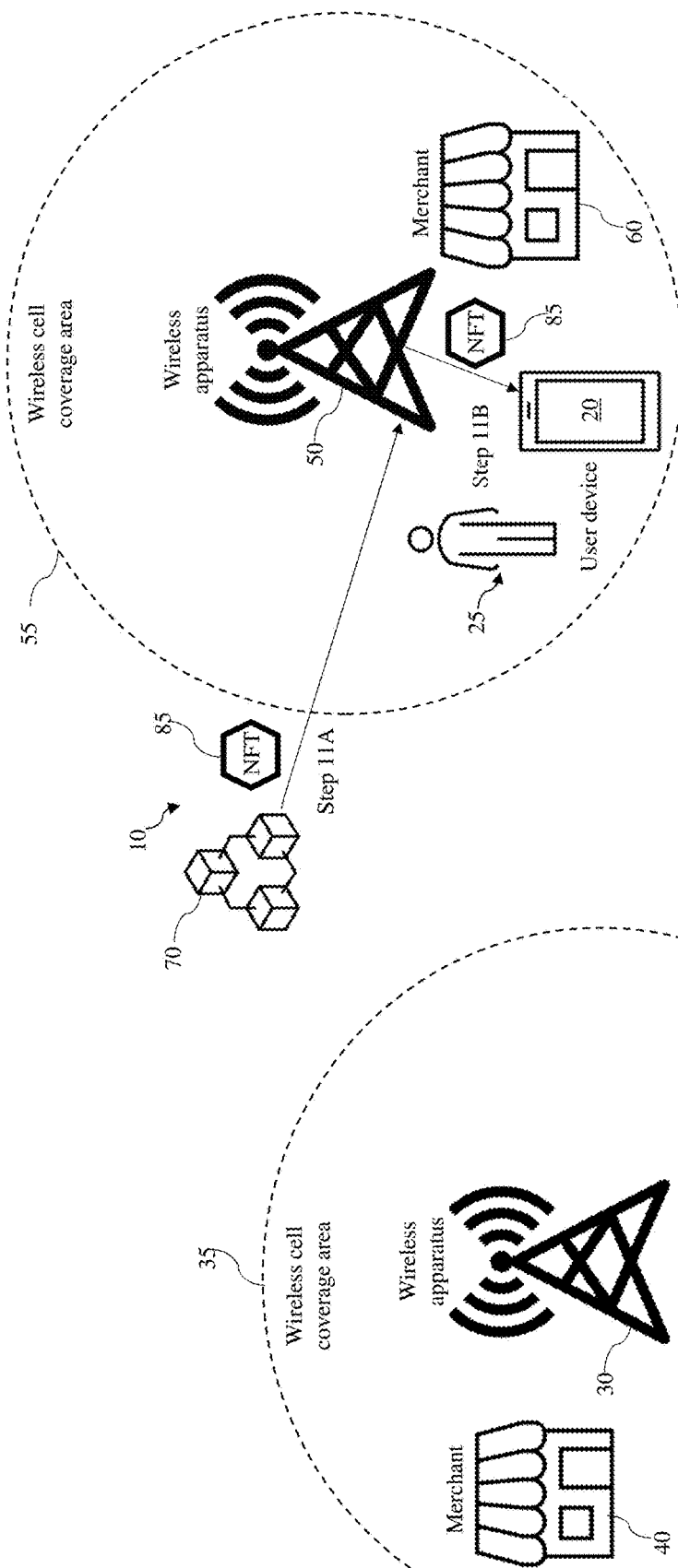

Referring now to FIG. 4, the blockchain 70 may generate one or more NFTs 85 in a step 11A of the process flow 10 to reflect the redemption status of the offers B and/or D. As discussed above, NFTs are each unique, and thus the NFTs 85 are different from the NFTs 80. Furthermore, although the NFTs 85 may include multiple NFTs (e.g., one NFT for the redemption of the offer E and another NFT for the redemption of the offer F), they are collectively illustrated as the NFTs 85 for the sake of simplicity. In other words, the NFTs 85 shown in FIG. 2 may represent not just one, but multiple NFTs. As was the case for the NFTs 80, the NFTs 85 are stored on the blockchain 70 and associated with the user profile of the user 25.

As another part of the step 11A, a record of the NFTs 85 or a link thereto is sent by the blockchain 70 to the wireless apparatus 50, which then forwards it to the user device 20 in a step 11B. Such a record or link to the NFTs 85 is then accessible on the user device 20 to allow the user 25 to view the NFTs 85, for example, via a mobile application running on the user device 20. The NFTs 85 (as well as the NFTs 80) may be used hereinafter as a decision factor for the generation and/or presentation of future offers for the user 25.

It is understood that the offers or incentives of the present disclosure are not limited to just discounts on products from merchants. In some embodiments, the offers or incentives may involve the use of a particular service or application, and it may have geographical or temporal restrictions. For example, a user shopping at a pharmacy may receive an offer where if the user uses a particular payment application (e.g., PAYPAL™) to pay for the items bought at the pharmacy in the next hour, then he/she may receive unlimited toppings at a frozen yogurt store located next to the pharmacy.

Multiple offers or incentives may also come from the same entity. As an example, the user may be visiting a home improvement store, which may be fairly large and may have several wireless apparatuses (e.g., millimeter wave technology devices) deployed therein at different departments. For example, one wireless apparatus may be deployed at the outdoor gardens section, another wireless apparatus may be deployed at the kitchens and baths section, and yet another wireless apparatus may be deployed at the tools section. While user comes within the wireless cell coverage area of the wireless apparatus deployed at the outdoor gardens section, he/she may receive an offer specifying that a purchase at the outdoor gardens section will unlock a 10% discount at the kitchens and baths section, thereby incentivizing the user to make a purchase at the outdoor gardens section and visit and make a purchase at the kitchens and baths section as well. In this example, the offer(s) may be generated by a single entity—the home improvement store—but involve different departments of that entity.

The offers or incentives herein may also involve not just merchants themselves (or other suitable entities that offer products or services directly), but also point-aggregation platforms such as HONEY™. For example, a point-aggregation platform may communicate with user devices and/or wireless apparatuses to keep track of the user 25's reward points or reward statuses across a plurality of merchants. The point-aggregation platform may also collaborate with the merchants to generate customized offers for the users. For example, suppose the user 25 may have accrued 500 reward points in a point-aggregation platform. The point-aggregation platform may detect that the user 25 is visiting a retailer by coming into the wireless cell coverage area of the wireless apparatus deployed at that retailer. The point-aggregation platform may collaborate with the retailer to generate an offer where the user 25's reward points are redeemable at that retailer at twice the normal redeemable rate (e.g., $2 worth of goods for every 100 points instead of $1 worth of goods for every 100 points) in the next 20 minutes.

In some embodiments, modern technologies such as virtual reality or augmented reality may also be used in conjunction with the offers to enhance a gamification aspect of the present disclosure. For example, while the user 25 is visiting a store, he/she may receive an offer to view a virtual reality demo or an augmented reality demo of a particular brand's product(s), in exchange for a discount on these product(s). The brand and/or the products from that brand may be customized for each user based on the user's profile, which as discussed above, may include various NFTs and other anonymized but personalized shopping data to reflect the user's unique shopping preferences and patterns. Such a gamification aspect of the present disclosure may be applied in various implementations of metaverses, since the stores or other merchants may have virtual representations in the metaverses as well.

Regardless of how the offers are generated, it can be seen that the present disclosure offers several significant advantages over conventional methods and systems. It is understood, however, that not all advantages are necessarily discussed in detail herein, different embodiments may offer different advantages, and that no particular advantage is required for all embodiments. One advantage is that the schemes of the present disclosure provide greater versatility, precision, and customizability compared to conventional systems, while still protecting the user's privacy and anonymity. For example, conventional offer schemes tend to be limited to individual businesses (e.g., punch cards at a sandwich shop), or to a one-time macro-scale incentive (e.g., reloading an account balance for 100 points at a coffee shop), or focus on competition between merchants (e.g., coupon matching or lowest price matching programs) rather than collaboration. In contrast, the offer schemes herein utilizes the location-dependent wireless apparatuses (e.g., millimeter wave technology devices having high frequency, high speed, and low latency) to customize offers for individual users based on their location.

Another advantage is more business collaboration opportunities. Since multiple merchants may each have their own associated wireless apparatus, they may collaborate, rather than compete, with one another to generate cross-business offers. This not only benefits the user (since the user now gets multiple different and more diverse offers), but also benefits the merchants themselves.

Another advantage is enhanced user privacy. Since much of the offer processing (e.g., selecting which offers to present to the user based on the user's profile) may occur locally on the user devices, and the data transmitted out of the user device is still anonymized, the schemes herein help to protect user privacy while obtaining customized offers for the user.

Yet another advantage is that the on-device data management allows for easy integration with existing different applications, such as payment applications and/or loyalty programs. Therefore, the schemes of the present disclosure does not take away from existing companies' rewards systems but leverages those existing applications (and their associated user profiles) to influence additional offer or incentive generation opportunities. Due to the flexibility of the offers and/or incentives, the present disclosure goes beyond mere "X dollars off or Y % off" and allow many different and more suitable types of experiences (e.g., augmented reality viewing of a product) to be generated or utilized. The centralized processing and/or storage of the offers and their acceptances and/or redemption via blockchain and NFTs also allows the building of a more universal and yet customized user profile.

The schemes of the present disclosure also improve the functionality of a machine or system. For example, one feature of millimeter wave technology networks is that the base station has a smaller cell radius. The present disclosure leverages this feature to associate individual merchants with different millimeter wave technology devices (e.g., 5G base stations, nodes, power stations, subnetworks, etc.). Some of the other features of millimeter wave technology networks, such as high frequency, fast speed, and low latency, are leveraged herein, so that as soon as the user comes near a merchant (e.g., by establishing a millimeter wave technology communication session with the millimeter wave technology device associated with the merchant), he/she may receive a list of offers. Though the offer generation process takes multiple steps, as discussed above with reference to FIGS. 1-4, the fast speed and low latency of the millimeter wave technology networks may make the user feel like the offers are presented almost instantaneously and with very little to no delay. Therefore, with the millimeter wave technology devices and the user device collectively functioning as a part of an offer generation and presentation system, the speed and customizability of the offers are improved.

As another example, the capabilities of blockchain systems are utilized to store each user's individual shopping history and/or offer acceptance or redemption statuses, for example via NFTs. Such a centralized and secure storage of the user's personalized data may allow the merchants to better track incentives given to each user, thereby improving the efficiency and efficacy of their offer generation. And as discussed above, the communications between the millimeter wave technology devices at different merchants may allow the different merchants to collaborate, rather than compete, with one another. Consequently, the merchants may be able to generate offers with cross-business incentives, thereby improving the functionality of the offer generation system as a whole.

As yet another example, the user device and/or the millimeter wave technology devices may have analytical software installed thereon to help select and present offers that are customized to the user. This is done by analyzing the user's personalized shopping data (e.g., accessible via the NFTs), so that only offers that are of greater interest to the user are presented, while offers that are not as interesting are filtered out. Compared to conventional devices that may inundate the user with all available offers (most of which may not be of interest to the user), the machines of the present disclosure (with the aid of the analytical software) can selectively present location-based targeted offers in real time that are much more likely to be accepted by the user. As a result of this improved computer functionality of the user device and/or the millimeter wave technology device (e.g., by having the analytical software executing thereon), user satisfaction is greater, since the user is not overwhelmed with too many unwanted offers.

The various aspects of the present disclosure are also integrated into a practical application, rather than mere abstract ideas. For example, a mobile application executing on the user device may announce the user's arrival at a particular merchant via millimeter wave technology wireless communications with a millimeter wave technology device (e.g., a 5G base station) deployed at (or otherwise associated with) the merchant. The mobile application may receive a list of offers generated by one or more merchants and relayed by the millimeter wave technology device. The mobile application may then perform local on-device processing to analyze the received offers in view of the shopping history or pattern (which may include one or more NFTs) to determine which subset of the offers to actually present to the user. The mobile application may also communicate with a blockchain at least in part via the millimeter wave technology communications with the millimeter wave technology device, so that the acceptance status and/or redemption status of the offers are recorded securely in the blockchain, and receive records or links to additional NFTs generated by the blockchain to correspond with the acceptance/redemption statuses. These are concrete steps involving tangible machines (e.g., user device and 5G base stations), the performance of which enables the user device to be used as a mobile wallet to easily and securely keep track of the user rewards programs.

Blockchain System Architecture

Referring now to FIGS. 5-9, the various details of the implementation of a blockchain system 100 are discussed. The blockchain system 100 may be used as an example blockchain system to implement the blockchain 70 discussed above. The blockchain system 100 includes a first client device 120, a second client device 125, a first server 150, a second server 152, and an Internet of Things (IoT) device 155 interconnected via a network 140. The first client device 120, the second client device 125, the first server 150, and the second server 152 may be a computing device 605 described in more detail with reference to FIG. 13. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 140 may be any of a variety of available networks, such as the Internet, and represents a worldwide collection of networks and gateways to support communications between devices connected to the network 140. The blockchain system 100 may also comprise one or more distributed or peer-to-peer (P2P) networks, such as a first, second, and third blockchain network 130a-c (generally referred to as blockchain networks 130).

Figure 5:
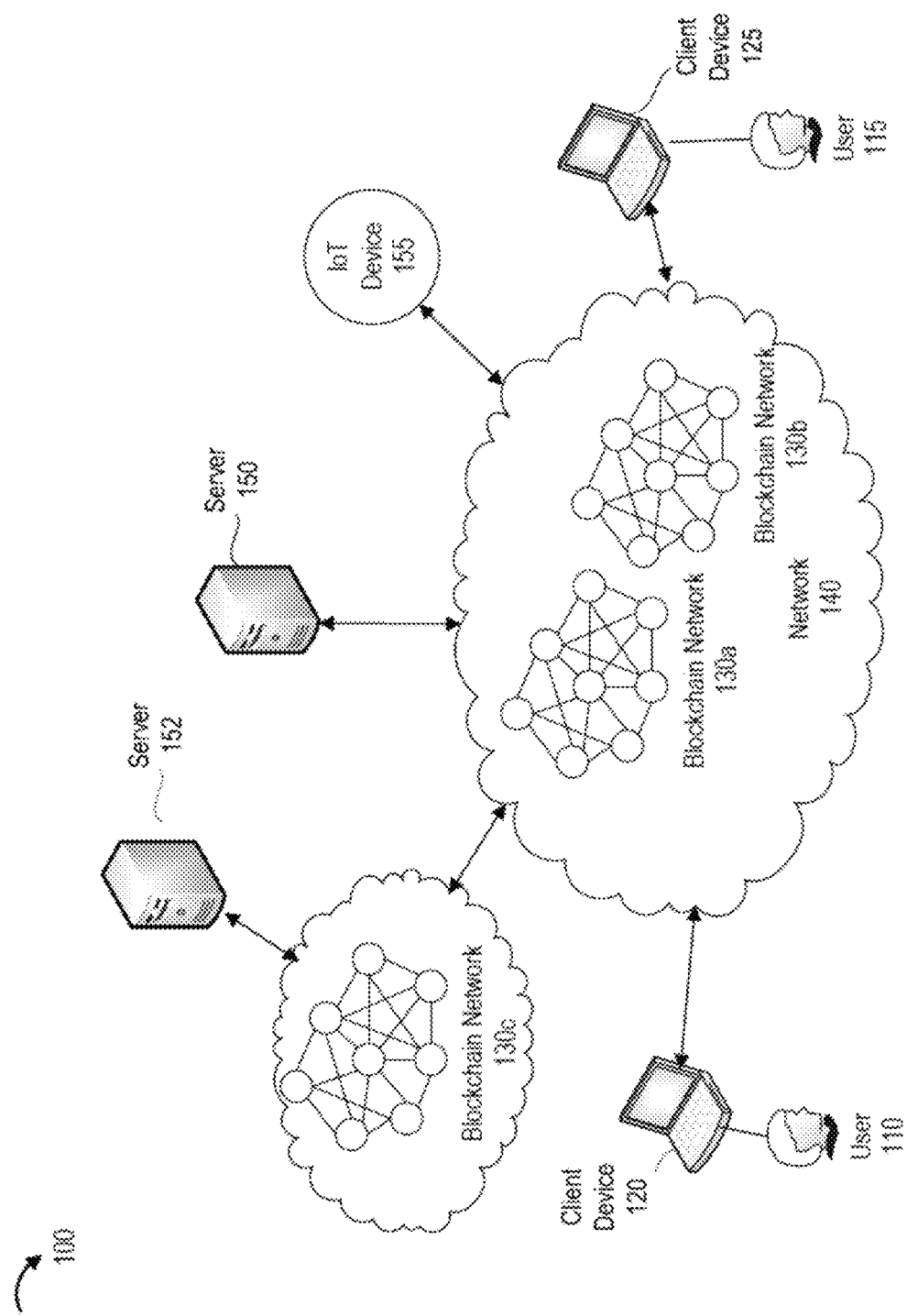
FIG. 5 illustrates an example computing architecture for facilitating one or more blockchain based transactions.

As shown in FIG. 5, the network 140 may comprise the first and second blockchain networks 130a and 130b. The third blockchain network 130c may be associated with a private blockchain as described below with reference to FIG. 6, and is thus, shown separately from the first and second blockchain networks 130a and 103b. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain may be stored at least at multiple nodes (or devices) of the one or more blockchain networks 130.

In one example, a blockchain based transaction may generally involve a transfer of data or value between entities, such as the first user 110 of the first client device 120 and the second user 115 of the second client device 125 in FIG. 5. The first server 150 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the first server 150. The first server 150 may send the requested transaction to one of the blockchain networks 130 to be validated and approved as discussed below.

Blockchain Network

Figure 6:
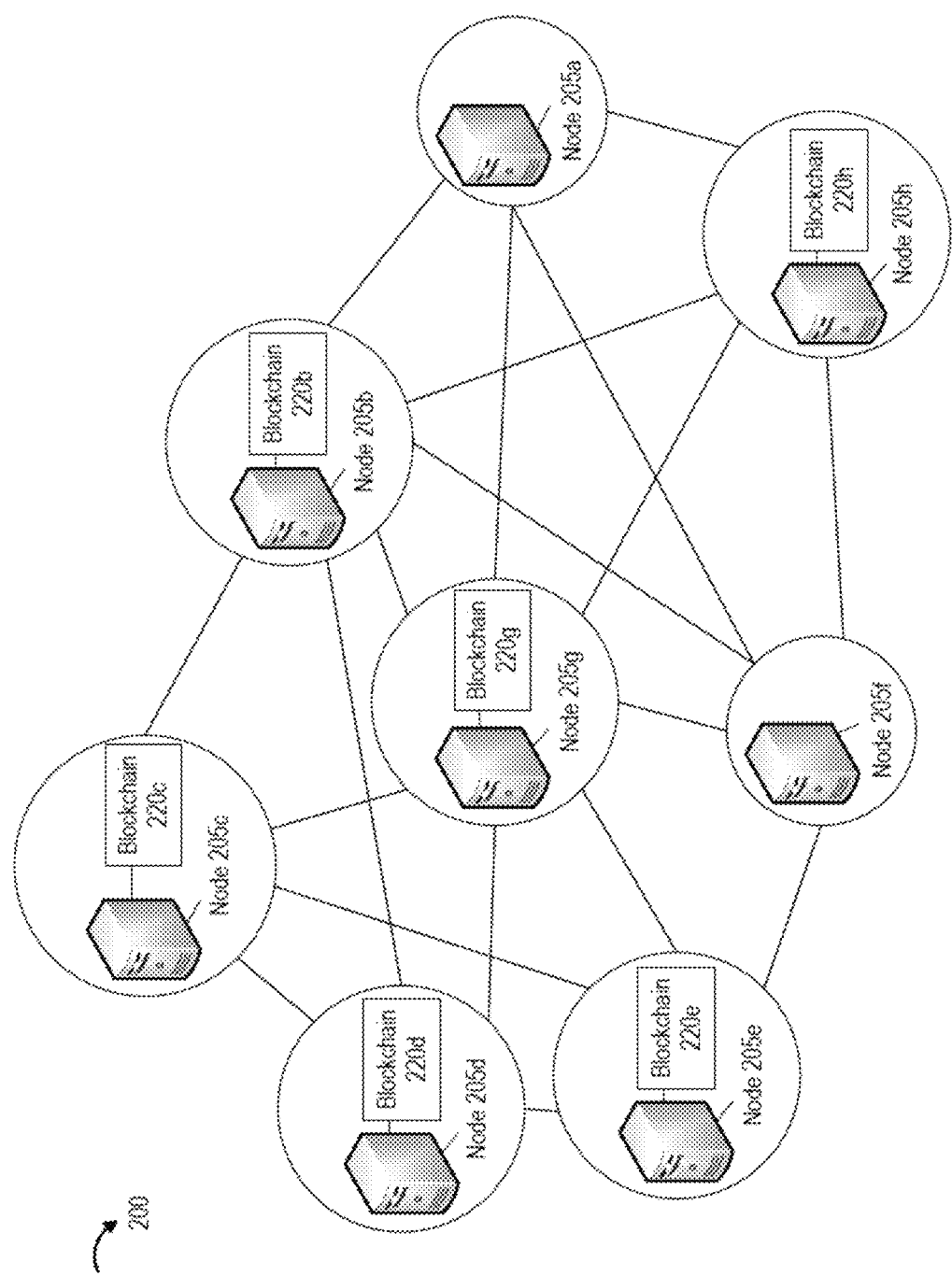
FIG. 6 illustrates an example blockchain network.

FIG. 6 shows an example blockchain network 200 comprising a plurality of interconnected nodes or devices 205a-h (generally referred to as nodes 205). Each of the nodes 205 may comprise a computing device 905 described in more detail with reference to FIG. 13. Although FIG. 6 shows a single device, each of the nodes 205 may comprise a plurality of devices (e.g., a pool). The blockchain network 200 may be associated with a blockchain 220. Some or all of the nodes 205 may replicate and save an identical copy of the blockchain 220. For example, FIG. 6 shows that the nodes 205b-e and 205g-h store copies of the blockchain 220. The nodes 205b-e and 205g-h may independently update their respective copies of the blockchain 220 as discussed below.

Blockchain Node Types

Blockchain nodes, for example, the nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, IoT devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 6, the lightweight nodes 205a and 205f may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

Figure 7:
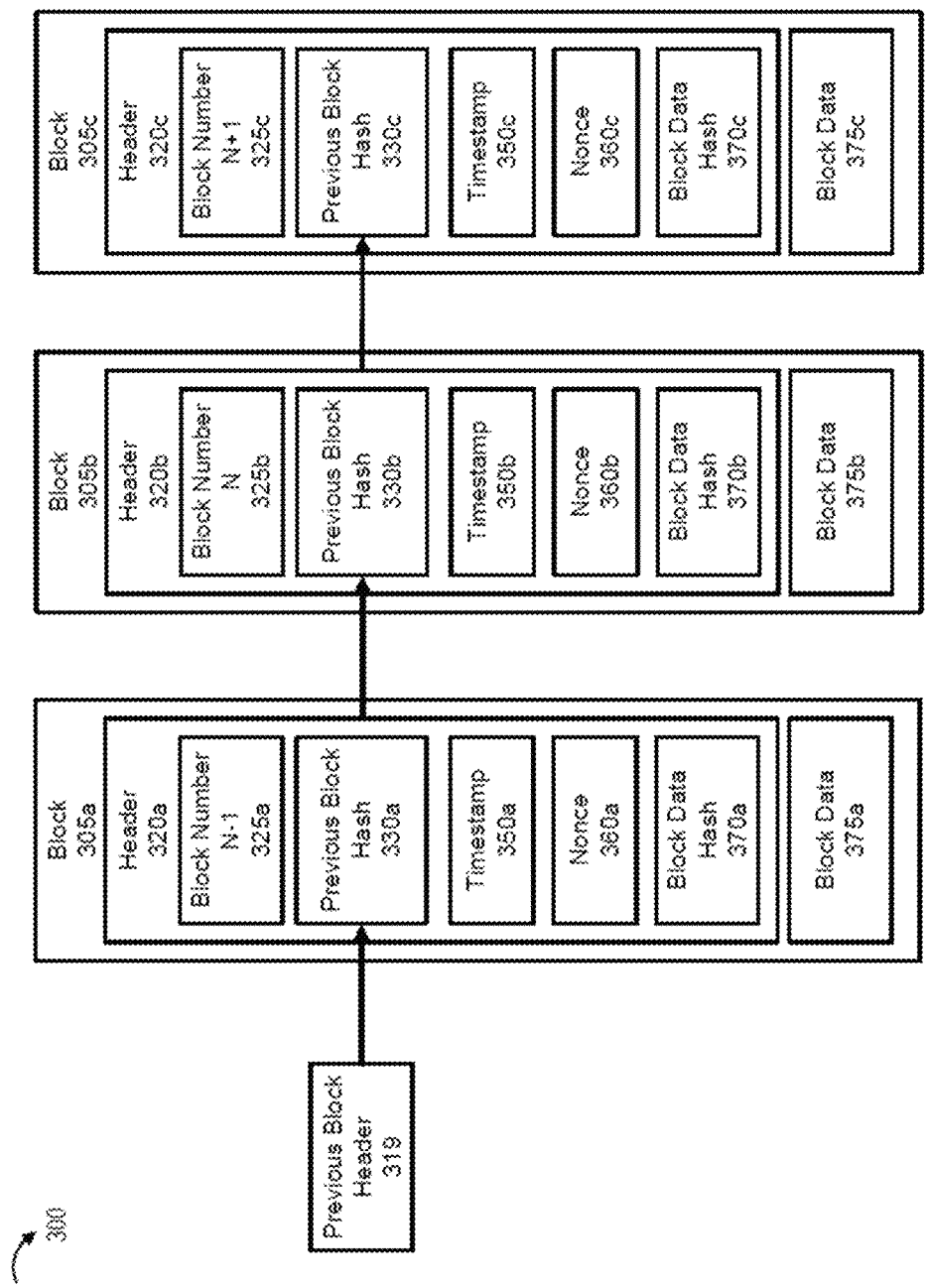
FIG. 7 illustrates an example blockchain.

As discussed above, a blockchain 220 may be associated with a blockchain network 200. FIG. 7 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 7, the block number 325a of the block 305a is N−1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 320b of the block N (block 305b) includes a data field (previous block hash 330b) comprising a hash representation of the previous block N−1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 5, the server 150 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 8:
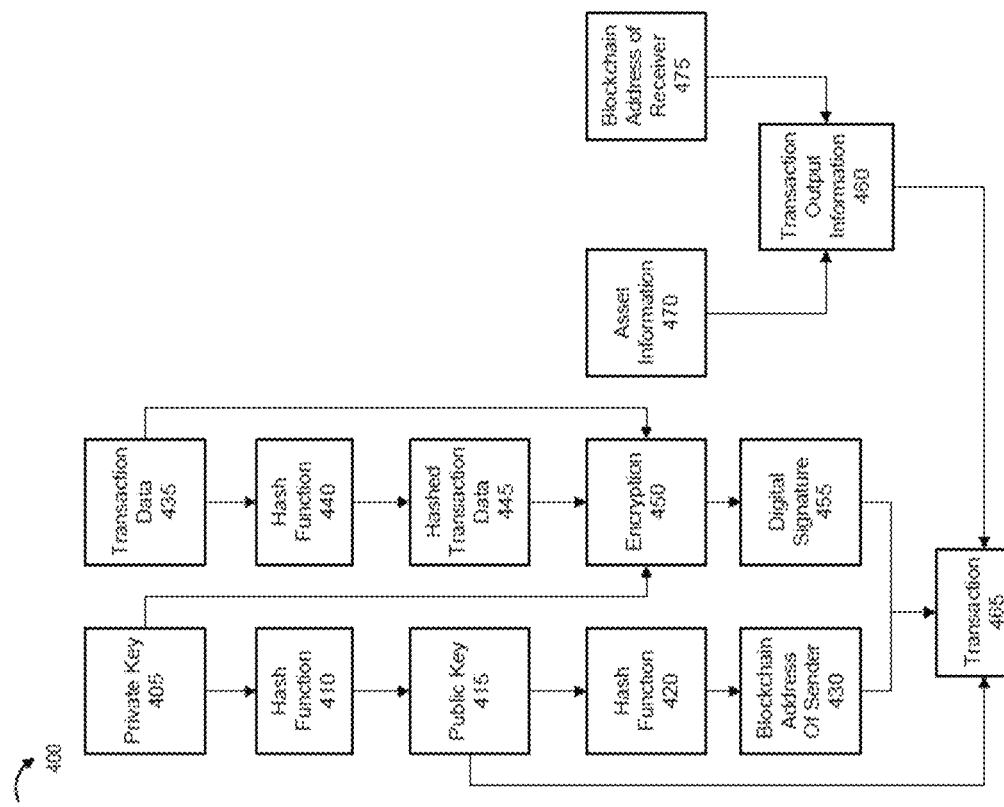
FIG. 8 is a diagram of an example transaction message.

FIG. 8 is a diagram 400 of a transaction 465 generated by the transaction application. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 470 and an address or identifier for the second user, such as the blockchain address of receiver 475. The transaction 465 may be sent from the client device 125 to the server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 8 as the blockchain address of sender, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 9:
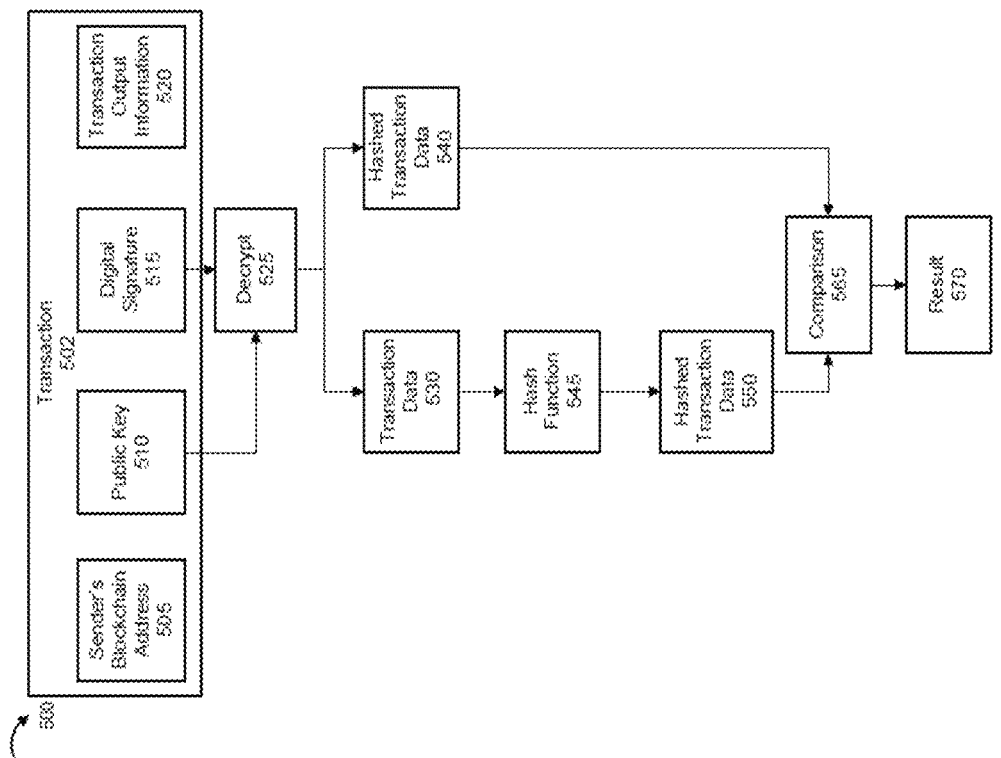
FIG. 9 shows an example transaction broadcast the blockchain network.

The first server 150 may receive transactions from users of the blockchain network 130. The transactions may be submitted to the first server 150 via desktop applications, smartphone applications, digital wallet applications, web services, or other software applications. The first server 150 may send or broadcast the transactions to the blockchain network 130. FIG. 9 shows a block diagram 500 illustrating an example transaction 502 broadcast by the first server 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcast to one or more specific nodes based on criteria related to the node's geography, history, reputation, market conditions, docket/delay, technology platform. The rules may be dynamically modified or updated (e.g., turned on or off) to address issues such as latency, scalability, and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 8, when the transaction application creates the transaction 465, it may indicate that the first user 110 is the originator of the transaction 465 by including the digital signature 455.

The node 205 may decrypt 525 the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205a may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions. In a blockchain implementation such as Bitcoin, the size of a block is constrained. Referring back to FIG. 7, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the block chain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to electronic attacks such as the 51% attack described above. The proof of stake model is generally less computationally intensive that the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g., in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcast to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain Based Application: Cryptocurrency and NFT

Cryptocurrency is a medium of exchange that may be created and stored electronically in a blockchain, such as a the blockchain 130$a$ in FIG. 5. Bitcoin is one example of cryptocurrency, however there are several other cryptocurrencies. Various encryption techniques may be used for creating the units of cryptocurrency and verifying transactions. As an example, the first user 110 may own 10 units of a cryptocurrency. The blockchain 130$a$ may include a record indicating that the first user 110 owns the 10 units of cryptocurrency. The first user 110 may initiate a transfer of the 10 units of cryptocurrency to the second user 115 via a wallet application executing on the first client device 120. The wallet application may store and manage a private key of the first user 110. Examples of the wallet device include a personal computer, a laptop computer, a smartphone, a personal data assistant (PDA), etc. In other embodiments, the blockchain system discussed above may be used to generate the NFTs, such as the NFTs 80 and 85 discussed above.

Machine Learning

Figure 10:
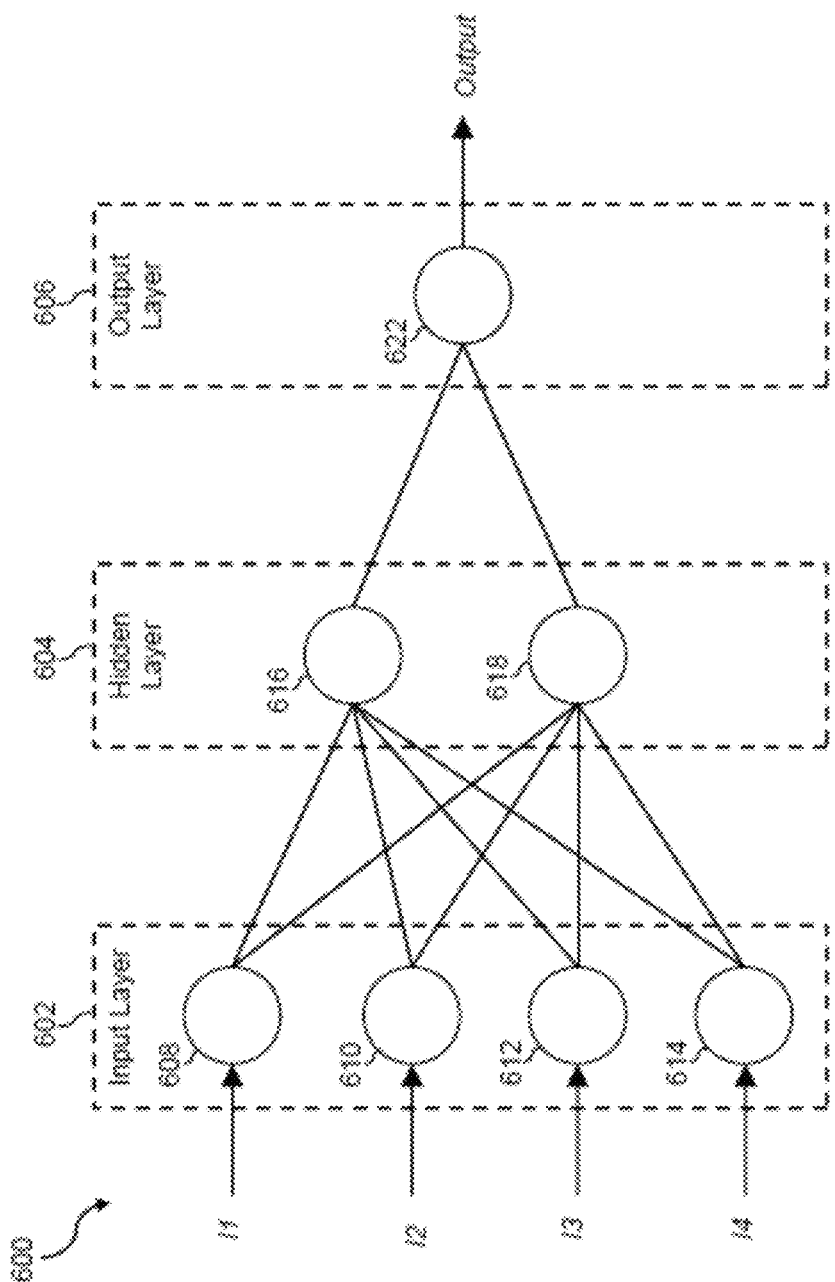
FIG. 10 illustrates an example neural network for machine learning.

As discussed above, machine learning may be used to learn and predict the user's offer preferences according various aspect of the present disclosure. For example, machine learning may be employed to determine which types of offers and/or what products need to be included in the offers for the offers to be accepted and/or redeemed by the user. In some embodiments, such a machine learning process may be performed at least in part via an artificial neural network, which may be used to determine the optimum value of epsilon. In that regard, FIG. 10 illustrates an example artificial neural network 600. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the machine learning module 260, and the machine learning module 260 may include as many hidden layers as necessary. In this example, the artificial neural network 600 receives a set of input values and produces an output value. Each node in the input layer 602 may correspond to a distinct input value.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the machine learning module 260, the output value produced by the artificial neural network 600 may indicate a likelihood of an event.

The artificial neural network 600 may be trained by using training data. For example, the training data herein may be the features extracted from historical data, such as a user's previous shopping history (e.g., based on NFTs). By providing training data to the artificial neural network 600, the nodes 616-618 in the hidden layer 604 may be trained (adjusted) such that an optimal output (e.g., determining a value for a threshold such as epsilon) is produced in the output layer 606 based on the training data. By continuously providing different sets of training data, and penalizing the artificial neural network 600 when the output of the artificial neural network 600 is incorrect (e.g., when the determined (predicted) likelihood is inconsistent with whether the event actually occurred for the transaction, etc.), the artificial neural network 600 (and specifically, the representations of the nodes in the hidden layer 604) may be trained (adjusted) to improve its performance in data classification. Adjusting the artificial neural network 600 may include adjusting the weights associated with each node in the hidden layer 604.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Networked System

Figure 11:
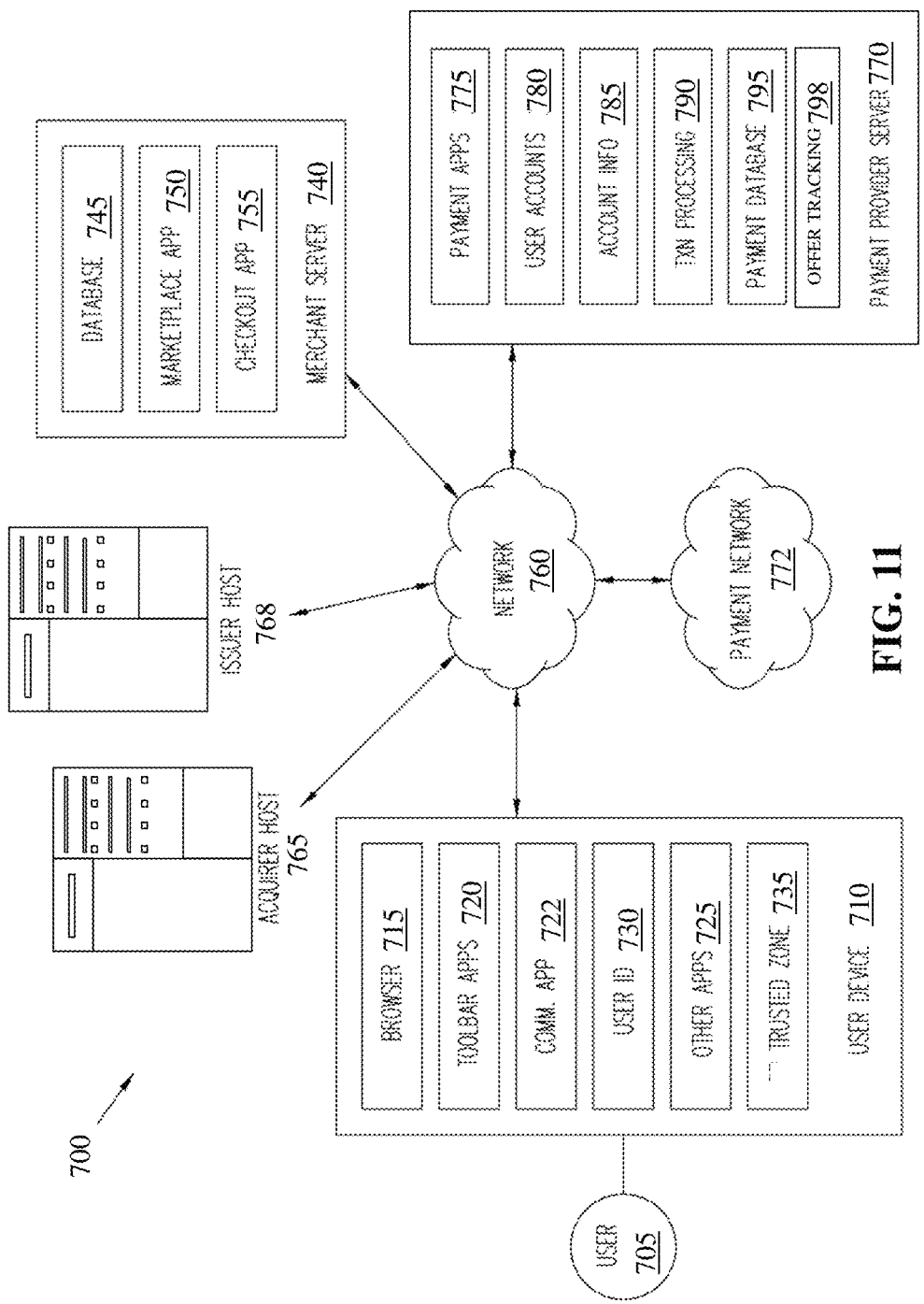
FIG. 11 is a simplified block diagram of a networked system according to various aspects of the present disclosure.

FIG. 11 is a block diagram of a networked system 700 suitable for conducting electronic transactions according to the various aspects of the present disclosure. The networked system 700 may comprise or implement a plurality of hardware devices and/or software components that operate on the hardware devices to perform various payment transactions or processes. Exemplary devices may include, for example, stand-alone and enterprise-class servers operating a server OS such as a MICROSOFT™ OS, a UNIX™ OS, a LINUX™ OS, or another suitable server-based OS. It can be appreciated that the servers illustrated in FIG. 11 may be deployed in other ways and that the operations performed, and/or the services provided by such servers may be combined or separated for a given implementation and may be performed by a greater number or fewer number of servers. One or more servers may be operated and/or maintained by the same or different entities. Exemplary devices may also include mobile devices, such as smartphones, tablet computers, or wearable devices. In some embodiments, the mobile devices may include an APPLE™ IPHONE™, an ANDROID™ smartphone, or an APPLE™ IPAD™, etc.

In the embodiment shown in FIG. 11, the system 700 may include a user device 710, a merchant server 740, a payment provider server 770, an acquirer host 765, an issuer host 768, and a payment network 772 that are in communication with one another over a network 760. The payment provider server 770 may be maintained by a payment service provider, such as PAYPAL™, Inc. of San Jose, CA A user 705, such as a consumer, may utilize user device 710 (as an embodiment of the user device 20 discussed above) to perform an electronic transaction using payment provider server 770. For example, user 705 may utilize user device 710 to receive offers generated by merchants, for example a merchant associated with the merchant server 740. The user 705 may then use the user device 710 to accept and/or redeem the offers, either by visiting the merchant's web site (provided by merchant server 740) or the merchant's brick-and-mortar store. Further, user 705 may utilize user device 710 to initiate a payment transaction, receive a transaction approval request, or reply to the request. Note that a transaction, as used here, refers to any suitable action performed using the user device, including payments, transfer of information, display of information, etc. Although only one merchant server is shown, a plurality of merchant servers may be utilized if the user is purchasing products from multiple merchants.

User device 710, merchant server 740, payment provider server 770, acquirer host 765, issuer host 768, and payment network 772 may each include one or more electronic processors, electronic memories, and other appropriate electronic components for executing instructions such as program code and/or data stored on one or more computer readable mediums to implement the various applications, data, and steps described here. For example, such instructions may be stored in one or more computer readable media such as memories or data storage devices internal and/or external to various components of system 700, and/or accessible over network 760.

Network 760 may be implemented as a single network or a combination of multiple networks. For example, in various embodiments, network 760 may include the Internet or one or more intranets, landline networks, wireless networks, and/or other appropriate types of networks. In some embodiments, the network 760 may include a millimeter wave technology wireless communication network, and it may include millimeter wave technology devices (e.g., 5G base stations or 5G cell towers) as example implementations of the wireless apparatuses discussed above with reference to FIGS. 1-4. Software programs (e.g., programs developed by the payment provider or by another entity) may be installed on the millimeter wave technology devices to facilitate the offer solicitation, transmission, and presentation processes discussed above. The network 760 may also include a blockchain network, such as the blockchain network discussed above with reference to FIGS. 5-9. Again, the transaction history (including the offer acceptance/redemption statuses) may be recorded into the blockchain.

User device 710 may be implemented using any appropriate hardware and software configured for wired and/or wireless communication over network 760. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an IPHONE™ or IPAD™ from APPLE™.

User device 710 may include one or more browser applications 715 which may be used, for example, to provide a convenient interface to permit user 705 to browse information available over network 760. For example, in one embodiment, browser application 715 may be implemented as a web browser configured to view information available over the Internet, such as a user account for online shopping and/or merchant sites for viewing and purchasing goods and/or services.

Still referring to FIG. 11, the user device 710 may also include one or more toolbar applications 720 which may be used, for example, to provide client-side processing for performing desired tasks in response to operations selected by user 705. In one embodiment, toolbar application 720 may display a user interface in connection with browser application 715.

User device 710 also may include other applications 725 to perform functions, such as email, texting, voice and IM applications that allow user 705 to send and receive emails, calls, and texts through network 760, as well as applications that enable the user to communicate, transfer information, make payments, and otherwise utilize a digital wallet through the payment provider as discussed here. In some embodiments, these other applications 725 may include a mobile application downloadable from an online application store (e.g., from the APPSTORE™ by APPLE™). The mobile application may be developed by the payment provider or by another entity, such as an offer aggregation entity. The mobile application may then communicate with other devices (e.g., 5G base stations or other millimeter wave technology devices) to perform the various steps of the process flow 10 discussed above with reference to FIGS. 1-4. In some embodiments, the execution of the mobile application may be done locally without contacting an external server such as the payment provider server 770. In other embodiments, one or more processes associated with the execution of the mobile application may involve or be performed in conjunction with the payment provider server 770 or another entity. In addition to allowing the user to receive, accept, and redeem offers, such a mobile application may also allow the user 705 to send payment transaction requests to the payment service provider server 770, which includes communication of data or information needed to complete the request, such as funding source information.

User device 710 may include one or more user identifiers 730 which may be implemented, for example, as operating system registry entries, cookies associated with browser application 715, identifiers associated with hardware of user device 710, or other appropriate identifiers, such as used for payment/user/device authentication. In one embodiment, user identifier 730 may be used by a payment service provider to associate user 705 with a particular account maintained by the payment provider. A communications application 722, with associated interfaces, enables user device 710 to communicate within system 700.

In conjunction with user identifiers 730, user device 710 may also include a trusted zone 735 owned or provisioned by the payment service provider with agreement from a device manufacturer. The trusted zone 735 may also be part of a telecommunications provider SIM that is used to store appropriate software by the payment service provider capable of generating secure industry standard payment credentials as a proxy to user payment credentials based on user 705's credentials/status in the payment providers system/age/risk level and other similar parameters.

Still referring to FIG. 11, the merchant server 740 may be maintained, for example, by a merchant or seller offering various products and/or services. The merchants 40 and 60 discussed above with reference to FIGS. 1-4 are non-limiting examples of the merchant associated with the merchant server 740. The merchant may have a physical point-of-sale (POS) store front. The merchant may be a participating merchant who has a merchant account with the payment service provider. Merchant server 740 may be used for POS or online purchases and transactions. Generally, merchant server 740 may be maintained by anyone or any entity that receives money, which includes charities as well as retailers and restaurants. For example, a purchase transaction may be payment or gift to an individual. Merchant server 740 may include a database 745 identifying available products and/or services (e.g., collectively referred to as items) which may be made available for viewing and purchase by user 705. Accordingly, merchant server 740 also may include a marketplace application 750 which may be configured to serve information over network 760 to browser 715 of user device 710. In one embodiment, user 705 may interact with marketplace application 750 through browser applications over network 760 in order to view various products, food items, or services identified in database 745.

Merchant server 740 also may include a checkout application 755 which may be configured to facilitate the purchase by user 705 of goods or services online or at a physical POS or store front. Checkout application 755 may be configured to accept payment information from or on behalf of user 705 through payment provider server 770 over network 760. For example, checkout application 755 may receive and process a payment confirmation from payment provider server 770, as well as transmit transaction information to the payment provider and receive information from the payment provider (e.g., a transaction ID). Checkout application 755 may be configured to receive payment via a plurality of payment methods including cash, credit cards, debit cards, checks, money orders, or the like. The merchant server 740 may also be configured to generate offers for the user 705 based on data received from the user device 710 via the network 760, in a manner consistent with the discussions above with reference to FIGS. 1-4.

Payment provider server 770 may be maintained, for example, by an online payment service provider which may provide payment between user 705 and the operator of merchant server 740. In this regard, payment provider server 770 may include one or more payment applications 775 which may be configured to interact with user device 710 and/or merchant server 740 over network 760 to facilitate the purchase of goods or services, communicate/display information, and send payments by user 705 of user device 710.

The payment provider server 770 also maintains a plurality of user accounts 780, each of which may include account information 785 associated with consumers, merchants, and funding sources, such as credit card companies. For example, account information 785 may include private financial information of users of devices such as account numbers, passwords, device identifiers, usernames, phone numbers, credit card information, bank information, or other financial information which may be used to facilitate online transactions by user 705. Advantageously, payment application 775 may be configured to interact with merchant server 740 on behalf of user 705 during a transaction with checkout application 755 to track and manage purchases made by users and which and when funding sources are used.

A transaction processing application 790, which may be part of payment application 775 or separate, may be configured to receive information from a user device and/or merchant server 740 for processing and storage in a payment database 795. Transaction processing application 790 may include one or more applications to process information from user 705 for processing an order and payment using various selected funding instruments, as described here. As such, transaction processing application 790 may store details of an order from individual users, including funding source used, credit options available, etc. Payment application 775 may be further configured to determine the existence of and to manage accounts for user 705, as well as create new accounts if necessary.

The payment provider server 770 may also include an offer tracking module 798 that may work in conjunction with the mobile application (e.g., the other applications 725) on the user device 710 to help the user keep track of and redeem the offers. In some embodiments, the offer tracking module 798 may include software code that serves as a backend of the mobile application, whereas the software code of the mobile application executing on the user device 710 serves as a front end of the mobile application.

Still referring to FIG. 11, the payment network 772 may be operated by payment card service providers or card associations, such as DISCOVER™, VISA™ MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 765 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 768 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Flowchart

Figure 12:
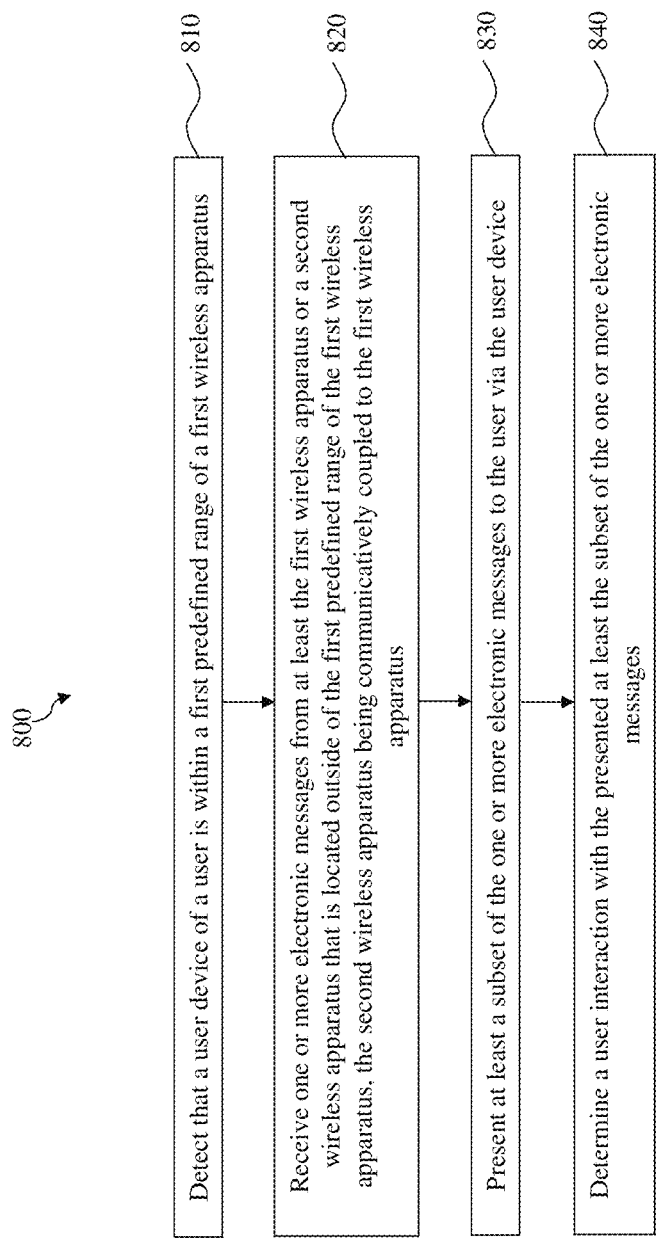
FIG. 12 is a flow diagram showing steps of an example method for generating, accepting, and redeeming offers according to various aspects of the present disclosure.

FIG. 12 is a flowchart illustrating a method 800 according to various aspects of the present disclosure. The method 800 includes a step 810 to detect that a user device of a user is within a first predefined range of a first wireless apparatus.

The method 800 includes a step 820 to receive one or more electronic messages from at least the first wireless apparatus or a second wireless apparatus that is located outside of the first predefined range of the first wireless apparatus. The second wireless apparatus is communicatively coupled to the first wireless apparatus.

The method 800 includes a step 830 to present at least a subset of the one or more electronic messages to the user via the user device.

The method 800 includes a step 840 to determine a user interaction with the presented at least the subset of the one or more electronic messages.

In some embodiments, the first wireless apparatus and the second wireless apparatus comprise millimeter wave devices. In some embodiments, step 810 comprises detecting that the user device is conducting millimeter wave wireless communications with the first wireless apparatus.

In some embodiments, the step 820 comprises receiving one or more offers from one or more merchant associated with the first wireless apparatus or with the second wireless apparatus. In some embodiments, a first subset of the one or more offers is related to a first merchant associated with the first wireless apparatus, and a second subset of the one or more offers is related to a second merchant associated with the second wireless apparatus. In some embodiments, the step 840 comprises determining that the user has accepted a first offer of the one or more offers. The method may further comprise a step of recording a user acceptance of the first offer in a blockchain. In some embodiments, the first offer is from a merchant associated with the second wireless apparatus. The method 800 may further comprise: detecting that the user device is within a second predefined range of the second wireless apparatus and that the user has redeemed the first offer; and recording a user redemption of the first offer in the blockchain. In some embodiments, the user acceptance of the first offer or the user redemption of the first offer is recorded in the blockchain in a form of a non-fungible token (NFT). The method 800 may further comprise a step of associating the NFT with a user profile of the user.

In some embodiments, the step 830 may comprise the following steps: analyzing a user profile of the user; and selecting, based on the analyzing of the user profile, the subset of the one or more electronic messages to be presented to the user. In some embodiments, the analyzing and the selecting are performed by a software application executing on the user device.

It is understood that, in some embodiments, one particular system or device may execute all of the steps 810-840. In some other embodiments, that particular system or device may execute a portion or a subset (but not all) of the steps 810-840, and that multiple systems or devices may collectively execute the steps 810-840.

It is also understood that additional method steps may be performed before, during, or after the steps 810-840 discussed above. For example, the method 800 may include a step of alerting the second wireless apparatus that the user device is within the first predefined range of the first wireless apparatus, and a step of requesting at least some of the one or more electronic messages from the second wireless apparatus. These steps may be performed between the steps 810 and 820 in some embodiments. As another example, the method 800 may include a step of communicating a status of the user interaction to at least the second wireless apparatus. For reasons of simplicity, other additional steps are not discussed in detail herein.

Computing Device

Figure 13:
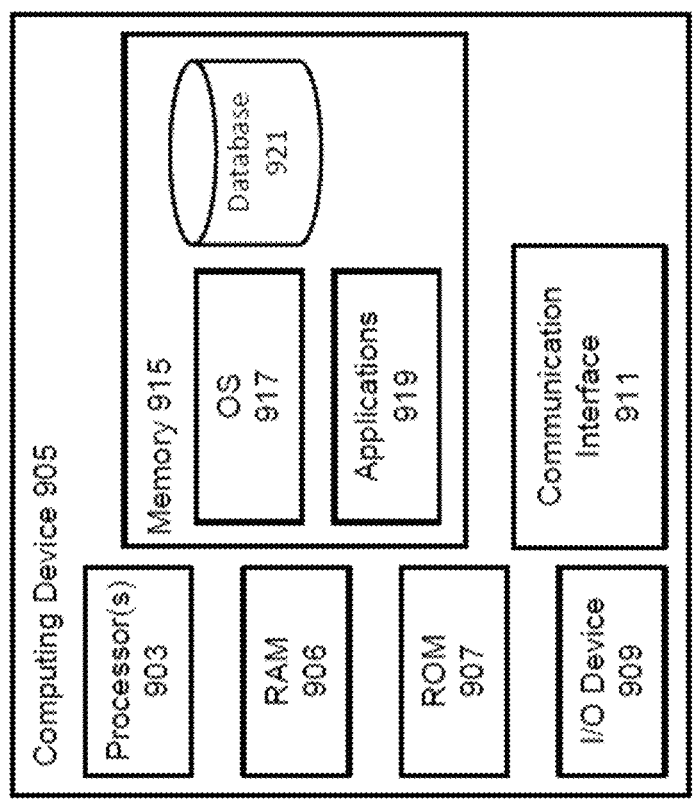
FIG. 13 illustrates an example computing device.

Turning now to FIG. 13, a computing device 905 that may be used with one or more of the computational systems is described. The computing device 905 may include a processor 903 for controlling overall operation of the computing device 905 and its associated components, including RAM 906, ROM 907, input/output device 909, communication interface 911, and/or memory 915. A data bus may interconnect processor(s) 903, RAM 906, ROM 907, memory 915, I/O device 909, and/or communication interface 911. In some embodiments, computing device 905 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 909 may include a microphone, keypad, touch screen, and/or stylus motion, gesture, through which a user of the computing device 905 may provide input, and may also include one or more speakers for providing audio output and a video display device for providing textual, audiovisual, and/or graphical output. Software may be stored within memory 915 to provide instructions to processor 903 allowing computing device 905 to perform various actions. For example, memory 915 may store software used by the computing device 905, such as an operating system 917, application programs 919, and/or an associated internal database 921. The various hardware memory units in memory 915 may include volatile and nonvolatile, removable and non-removable media implemented in any method or technology for storage of information such as computer-readable instructions, data structures, program modules, or other data. Memory 915 may include one or more physical persistent memory devices and/or one or more non-persistent memory devices. Memory 915 may include, but is not limited to, random access memory (RAM) 906, read only memory (ROM) 907, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 903.

Communication interface 911 may include one or more transceivers, digital signal processors, and/or additional circuitry and software for communicating via any network, wired or wireless, using any protocol as described herein.

Processor 903 may include a single central processing unit (CPU), which may be a single-core or multi-core processor, or may include multiple CPUs. Processor(s) 903 and associated components may allow the computing device 905 to execute a series of computer-readable instructions to perform some or all of the processes described herein. Although not shown in FIG. 9, various elements within memory 915 or other components in computing device 905, may include one or more caches, for example, CPU caches used by the processor 903, page caches used by the operating system 917, disk caches of a hard drive, and/or database caches used to cache content from database 921. For embodiments including a CPU cache, the CPU cache may be used by one or more processors 903 to reduce memory latency and access time. A processor 903 may retrieve data from or write data to the CPU cache rather than reading/writing to memory 915, which may improve the speed of these operations. In some examples, a database cache may be created in which certain data from a database 921 is cached in a separate smaller database in a memory separate from the database, such as in RAM 906 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 905 are described separately, functionality of the various components may be combined and/or performed by a single component and/or multiple computing devices in communication without departing from the invention.

One aspect of the present disclosure pertains to a method. The method includes: detecting that a user device of a user is within a first predefined range of a first wireless apparatus; receiving one or more electronic messages from at least the first wireless apparatus or a second wireless apparatus that is located outside of the first predefined range of the first wireless apparatus, the second wireless apparatus being communicatively coupled to the first wireless apparatus; presenting at least a subset of the one or more electronic messages to the user via the user device; and determining a user interaction with the presented at least the subset of the one or more electronic messages.

Another aspect of the present disclosure pertains to a system. The system includes a non-transitory memory and one or more hardware processors coupled to the non-transitory memory and configured to read instructions from the non-transitory memory to cause the system to perform operations comprising: detecting a first wireless communication between a user device of a user and a first wireless device at a first location; electronically notifying, in response to the detecting the first wireless communication, a second wireless device at a second location that the user is ready to receive offers, wherein the first wireless device and the second wireless device both operate in a gigahertz frequency spectrum; receiving one or more offers from the second wireless device; presenting, at least in part via the user device, at least a subset of the one or more offers to the user; and receiving a user acceptance of a first offer of the subset of the offers.

Yet another aspect of the present disclosure pertains to a method. The method includes: determining that a user device of a user is engaged in a first wireless communication session with a first wireless apparatus; obtaining, based on the determining, one or more offers from a first merchant associated with the first wireless apparatus and a second merchant associated with a second wireless apparatus located remotely from the first wireless apparatus, wherein the first wireless apparatus and the second wireless apparatus are both based on millimeter wave technology; analyzing a user profile of the user; presenting, based on the analyzing, at least a subset of the one or more offers to the user; determining that the user has accepted at least a first offer of the one or more offers, wherein the first offer involves both the first merchant and the second merchant; determining, after the determining that the user has accepted at least the first offer, that the user device is engaged in a second wireless communication session with the second wireless apparatus; and facilitating, at least in part via the second wireless communication session, an electronic redemption of the first offer by the user.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
   detecting that a user device of a user is within a first predefined range of a first wireless apparatus;
   receiving one or more electronic messages from at least the first wireless apparatus or a second wireless apparatus that is located outside of the first predefined range of the first wireless apparatus, the second wireless apparatus being communicatively coupled to the first wireless apparatus, the one or more electronic messages comprising a plurality of offers;
   presenting at least a subset of the one or more electronic messages to the user via the user device;
   determining a plurality of user interactions with at least the subset of the one or more electronic messages, wherein the plurality of user interactions comprise a user acceptance, a user decline, or a lack of a user response to a first offer of the plurality of offers; and
   recording the user acceptance, the user decline, or the lack of user response to the first offer to a blockchain.

2. The method of claim 1, wherein:
   the first wireless apparatus and the second wireless apparatus comprise millimeter wave devices; and
   the detecting that the user device is within the first predefined range of the first wireless apparatus comprises detecting that the user device is conducting millimeter wave wireless communications with the first wireless apparatus.

3. The method of claim 1, further comprising, before the receiving the one or more electronic messages and after the detecting:
   alerting the second wireless apparatus that the user device is within the first predefined range of the first wireless apparatus; and
   requesting at least one of the one or more electronic messages from the second wireless apparatus.

4. The method of claim 1, wherein the receiving the one or more electronic messages comprises receiving one or more offers of the plurality of offers from one or more merchants associated with the first wireless apparatus or with the second wireless apparatus.

5. The method of claim 4, wherein:
   a first subset of the one or more offers is related to a first merchant associated with the first wireless apparatus; and
   a second subset of the one or more offers is related to a second merchant associated with the second wireless apparatus.

6. The method of claim 1, wherein:
   the first wireless apparatus is associated with a first merchant that is within a cellular coverage area of the first wireless apparatus; and
   the second wireless apparatus is associated with a second merchant that is within a cellular coverage area of the second wireless apparatus but not within the cellular coverage area of the first wireless apparatus.

7. The method of claim 1, wherein the first offer is from a merchant associated with the second wireless apparatus, and wherein the method further comprises:
   detecting that the user device is within a second predefined range of the second wireless apparatus and that the user has redeemed the first offer; and
   recording a user redemption of the first offer in the blockchain.

8. The method of claim 7, wherein the user acceptance of the first offer or the user redemption of the first offer is recorded in the blockchain in a form of a non-fungible token (NFT), and wherein the method further comprises associating the NFT with a user profile of the user.

9. The method of claim 1, wherein the presenting comprises:
   analyzing a user profile of the user; and
   selecting, based on the analyzing of the user profile, the subset of the one or more electronic messages to be presented to the user.

10. The method of claim 9, wherein the analyzing and the selecting are performed by a software application executing on the user device.

11. The method of claim 1, further comprising: communicating a status of the user interaction to at least the second wireless apparatus.

12. A system, comprising:
   a non-transitory memory; and
   one or more hardware processors coupled to the non-transitory memory and configured to read instructions from the non-transitory memory to cause the system to perform operations comprising:
      detecting a first wireless communication between a user device of a user and a first wireless device at a first location;
      electronically notifying, in response to the detecting the first wireless communication, a second wireless device at a second location that the user is ready to receive offers, wherein the first wireless device and the second wireless device both operate in a gigahertz frequency spectrum;
      receiving one or more offers from the second wireless device;
      presenting, at least in part via the user device, at least a subset of the one or more offers to the user;
      receiving a user acceptance of a first offer of the subset of the offers; and
      recording the user acceptance of the first offer in a blockchain.

13. The system of claim 12, wherein the operations further comprise, before the presenting:
   analyzing a user profile of the user; and
   determining, based on the analyzing, that the subset of the one or more offers should be presented to the user.

14. The system of claim 13, wherein the analyzing and the determining are performed via software that executes locally on the user device.

15. The system of claim 12, wherein the operations further comprise:
communicating the user acceptance of the first offer to the second wireless device;
detecting, subsequent to the communicating of the user acceptance, a second wireless communication between the user device and the second wireless device;
determining, at least in part based on content obtained from the second wireless communication, that the user has redeemed the first offer; and
recording a user redemption of the first offer in the blockchain.

16. The system of claim 15, wherein the operations further comprise generating a non-fungible token (NFT) based on the user acceptance of the first offer or based on the user redemption of the first offer.

17. A method, comprising:
determining that a user device of a user is engaged in a first wireless communication session with a first wireless apparatus;
obtaining one or more offers from a first merchant associated with the first wireless apparatus and a second merchant associated with a second wireless apparatus located outside a predetermined distance from the first wireless apparatus, wherein the first wireless apparatus and the second wireless apparatus are both based on millimeter wave technology;
analyzing a user profile of the user;
presenting, based on the analyzing, at least a subset of the one or more offers to the user;
determining that the user has accepted at least a first offer of the one or more offers, wherein the first offer involves both the first merchant and the second merchant;
determining, after the determining that the user has accepted at least the first offer, that the user device is engaged in a second wireless communication session with the second wireless apparatus;
facilitating, at least in part via the second wireless communication session, an electronic redemption of the first offer by the user; and
electronically writing, to a blockchain, a user acceptance of the first offer or the electronic redemption of the first offer by the user.

18. The method of claim 17, further comprising: electronically writing, to the blockchain, a user decline or a lack of a user response to a second offer of the one or more offers.

19. The method of claim 18, further comprising:
generating a non-fungible token (NFT), the NFT representing the user acceptance of the first offer or the electronic redemption of the first offer by the user; and
associating the NFT with a user profile of the user.

20. The method of claim 17, wherein the analyzing is performed using software that resides locally on the user device.

* * * * *